(12) United States Patent
Kato

(10) Patent No.: US 11,505,018 B2
(45) Date of Patent: Nov. 22, 2022

(54) MODULAR VEHICLE HITCH ACCESSORY SYSTEM AND RELATED METHODS

(71) Applicant: Brandon Kato, Morro Bay, CA (US)

(72) Inventor: Brandon Kato, Morro Bay, CA (US)

(*) Notice: Subject to any disclaimer, the term of this patent is extended or adjusted under 35 U.S.C. 154(b) by 279 days.

(21) Appl. No.: 16/858,632

(22) Filed: Apr. 26, 2020

(65) Prior Publication Data
US 2021/0331538 A1 Oct. 28, 2021

(51) Int. Cl.
| B60D 1/44 | (2006.01) |
| B60D 1/52 | (2006.01) |
| B60D 1/54 | (2006.01) |
| B60R 9/06 | (2006.01) |
| B60R 11/00 | (2006.01) |

(52) U.S. Cl.
CPC ............... *B60D 1/44* (2013.01); *B60D 1/52* (2013.01); *B60D 1/54* (2013.01); *B60R 9/06* (2013.01); *B60R 2011/0066* (2013.01); *B60R 2011/0071* (2013.01); *B60R 2011/0078* (2013.01)

(58) Field of Classification Search
CPC ....................................................... B60D 1/44
See application file for complete search history.

(56) References Cited

U.S. PATENT DOCUMENTS

| 6,129,371 A | * | 10/2000 | Powell | B60R 9/06 280/491.5 |
| 9,333,822 B1 | * | 5/2016 | LaFave | B60R 9/06 |
| 2009/0140024 A1 | * | 6/2009 | McLemore | B60R 9/06 224/495 |
| 2014/0291370 A1 | * | 10/2014 | Donnigan | B60R 9/08 224/502 |
| 2014/0338137 A1 | * | 11/2014 | Stokes | B60P 1/43 14/71.1 |
| 2015/0224837 A1 | * | 8/2015 | Anyan | B60R 9/06 280/504 |
| 2017/0334361 A1 | * | 11/2017 | Jones | B60R 9/06 |
| 2018/0086279 A1 | * | 3/2018 | Anton | B60R 9/00 |
| 2018/0178703 A1 | * | 6/2018 | Keck | B60R 9/065 |
| 2018/0354427 A1 | * | 12/2018 | Yazdian | B60R 9/10 |

FOREIGN PATENT DOCUMENTS

WO WO-2019178169 A1 * 9/2019 ............. B60R 11/06

* cited by examiner

*Primary Examiner* — Jacob D Knutson
*Assistant Examiner* — Ryan Hardy
(74) *Attorney, Agent, or Firm* — Sierra IP Law, PC; William K. Nelson

(57) ABSTRACT

The present invention provides a vehicle hitch system having a plurality of modular and easily interchangeable accessory attachments. Each accessory attachment may be operable to secure one or more pieces of equipment useful for the user's preferred activities. The system may include a base and a plurality of different accessory attachments, the base comprising a vehicle mount, a connector, and a support frame, and each of the accessory attachments may comprise an accessory mount and an accessory support.

20 Claims, 15 Drawing Sheets

FIG. 4
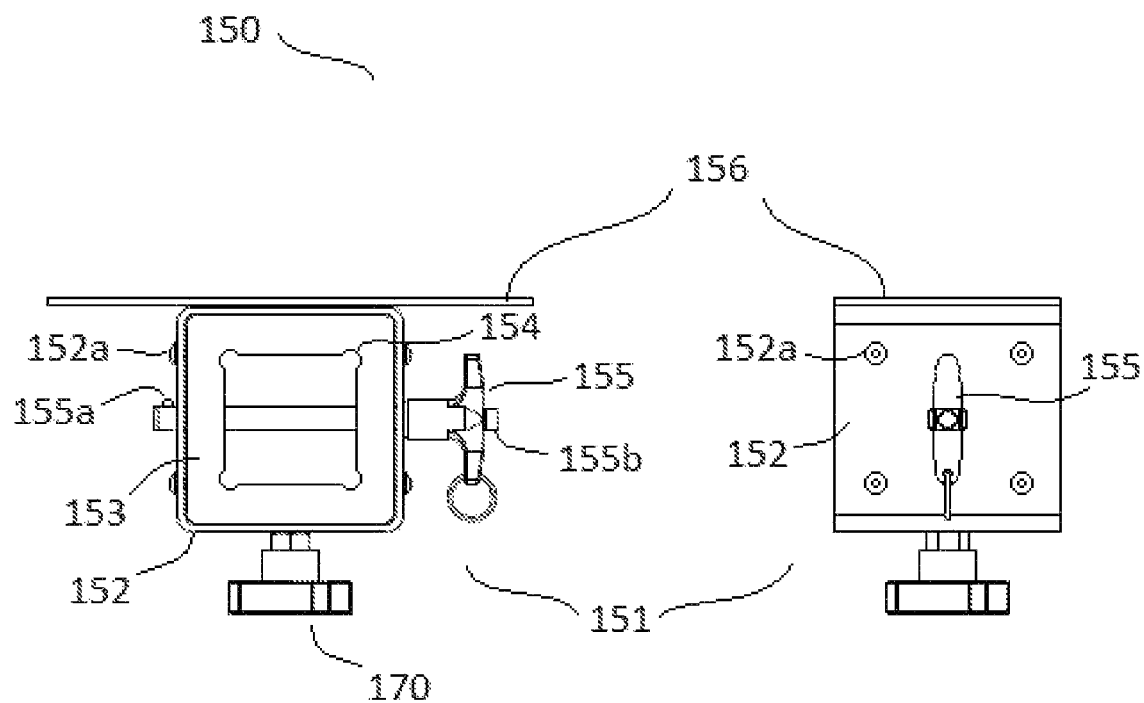
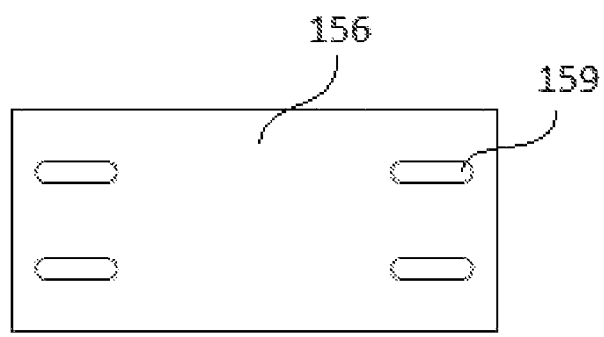

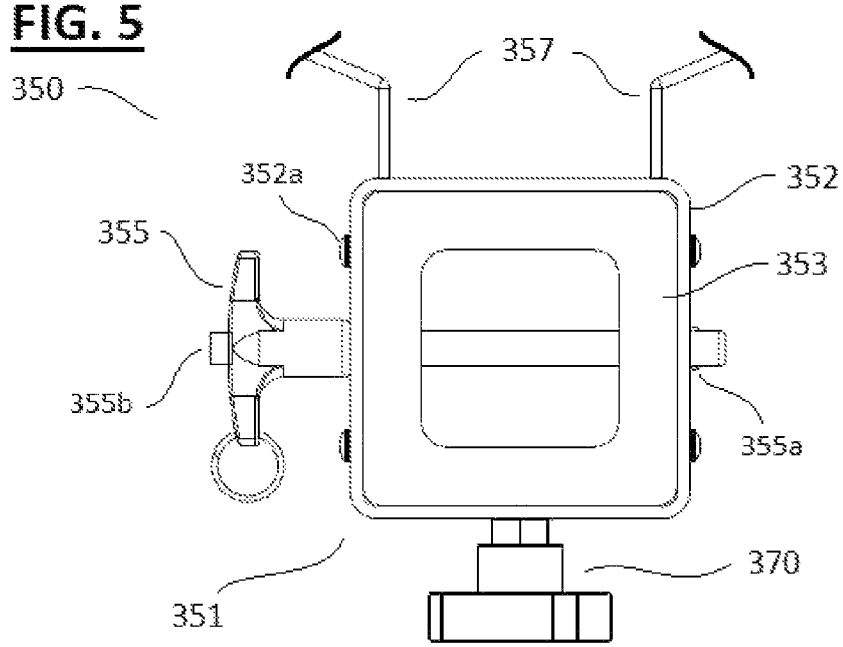
FIG. 5
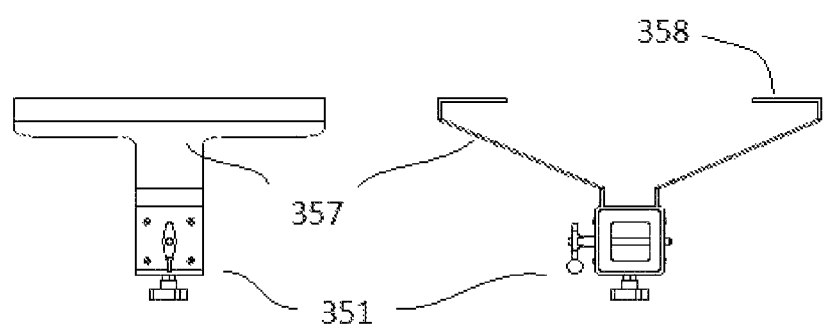
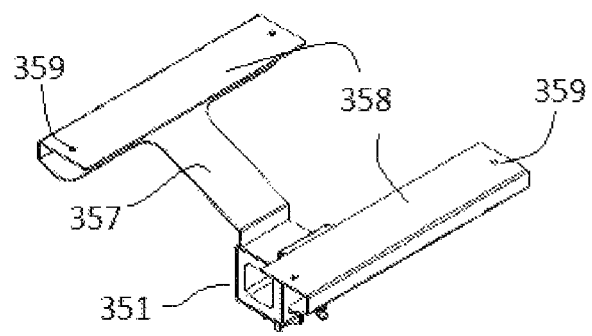

FIG. 9
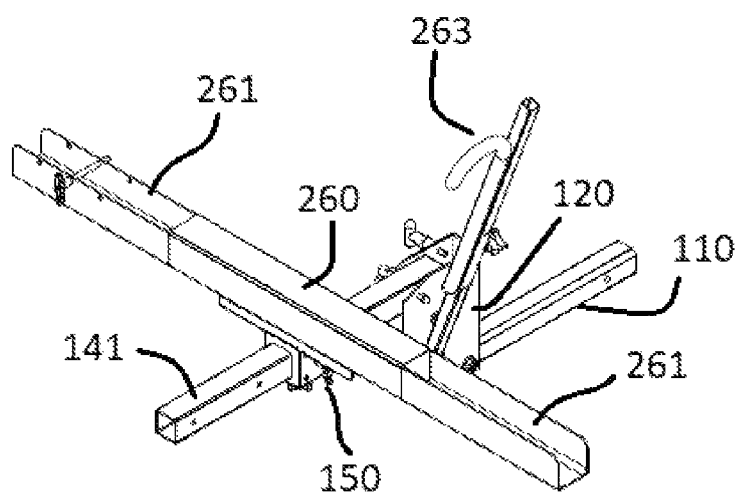
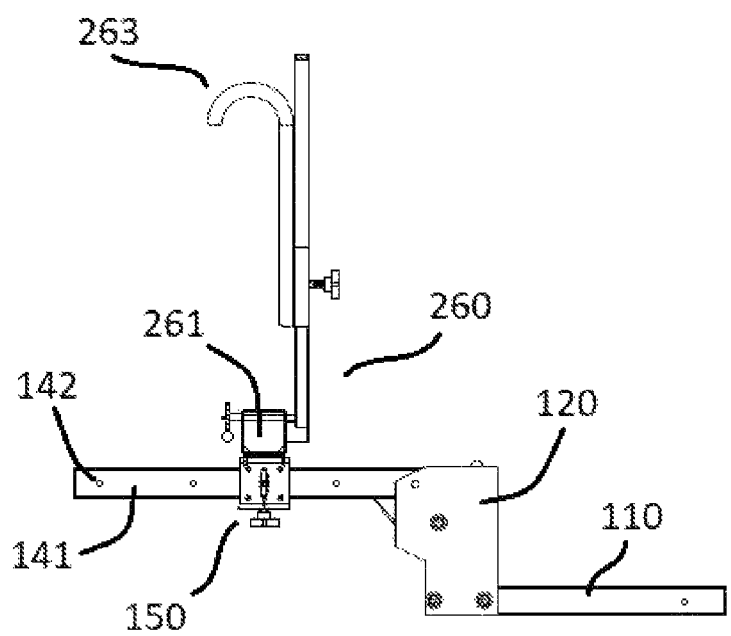

FIG. 14
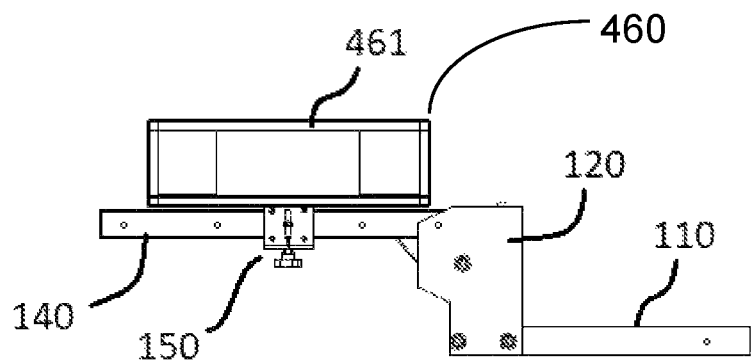
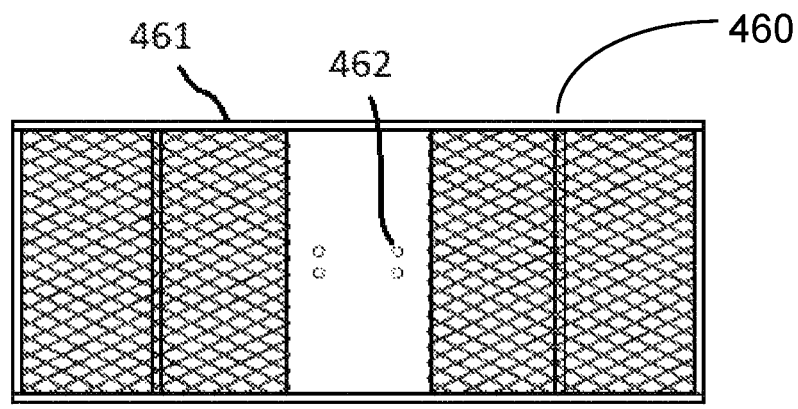
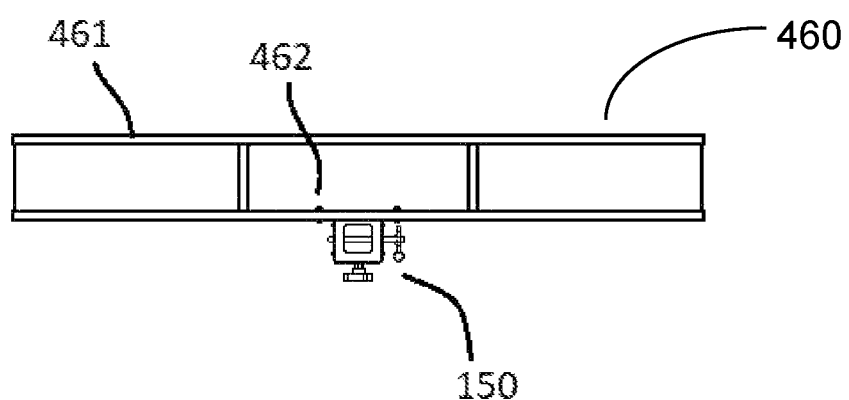

MODULAR VEHICLE HITCH ACCESSORY SYSTEM AND RELATED METHODS

FIELD OF THE INVENTION

The present invention relates generally to a vehicle hitch attachment system, and more specifically to a vehicle hitch system having various modular accessory attachments, each being useful for a different purpose, and methods for using the same.

BACKGROUND OF THE INVENTION

The statements in this section merely provide background information related to the present disclosure and may not constitute prior art.

Many people participate in activities which require the use of large pieces of equipment, such as bicycles, skis or snowboards, paddleboards or surf boards, coolers, bar-b-que grills, and the like. Such activities are often enjoyed in places that are not within walking distance from the home, and the equipment must be transported by vehicle to the particular destination. However, many vehicles may not have sufficient cargo space to securely transport the equipment, particularly when there are several people—along with and all of their equipment—being transported in the same vehicle. Further some pieces of equipment cannot be utilized with certain types of vehicles. For instance, if the vehicle does not have a tailgate and an uncovered truck bed, a grill would need to be placed on the ground while in use. Also, if the vehicle is tall it may be difficult to secure and remove equipment to the roof, and if the vehicle is raised, it can be difficult to load heavy equipment—or furry friends who can no longer jump due to arthritis in their hips—into the back of the vehicle.

One solution to these problems is to utilize a trailer hitch attachment. This is done by removing the vehicle's ball attachment from the hitch receiver, and replacing it with an accessory attachment. Conventional hitch attachments may provide a means for securing a piece of equipment to the vehicle, but they have several substantial drawbacks.

The primary difficulty with conventional hitch attachments is that they are not adaptable, being intended only for one particular purpose. For instance, a conventional hitch attachment may be designed to secure a bicycle(s) to the vehicle, but it cannot secure a surfboard. Or, the conventional attachment may be able to secure a snowboard(s) to the vehicle, but cannot hold a grill. Thus, if a user wants to bring several friends snowboarding one day, and bring them tailgating at a football game with a grill attached to the vehicle the next day, a single conventional hitch attachment would be insufficient. In order to participate in several different types of activities, a user must own several different conventional hitch attachments. Collecting all of the different hitch attachments which may support the user's preferred activities may be prohibitively expensive. Also, different vehicles may have differently sized or shaped hitch receivers, and it may be difficult, or impossible, to find all of the different hitch attachments desired by the user which can safely fit the vehicle's receiver.

Further, each conventional hitch attachment necessarily includes a support structure large enough to both support the intended equipment and to engage with the hitch receiver. Thus, each attachment may be large, heavy, and awkward to lift. Conventional attachments are typically secured to the hitch receiver via a linchpin with a secondary hitch pin (i.e., an R clip) which may rust or gather dirt and be difficult to remove. Other attachments may engage with the receiver via a bolt and nut, which may require a tool (i.e., a wrench) to use. Therefore, conventional hitch attachments may be difficult to install, particularly when the user doesn't have help from a second person. It may also be difficult to store a collection of hitch attachments sufficient to support all of the user's preferred activities. Finally, conventional hitch attachments may not be adjustable in length, height, or the angle at which the attachment is supported (i.e., diagonally rather than parallel with the ground), and it may not be able to fold up to reduce its footprint when the equipment is removed.

Thus, what is needed is an improved hitch attachment system which addresses each of the failures of conventional systems.

SUMMARY OF THE INVENTION

The present invention provides a vehicle hitch system having a plurality of modular and easily interchangeable accessory attachments. Each accessory attachment may be operable to secure one or more pieces of equipment useful for the user's preferred activities. The system may include a base and a plurality of different accessory attachments, the base comprising a vehicle mount, a connector, and a support frame, and each of the accessory attachments may comprise an accessory mount and an accessory support.

Vehicle Mount

The vehicle mount may comprise any apparatus operable to secure the base to an attachment mechanism of a vehicle. In some embodiments, the vehicle mount may comprise a support member operable to be secured at a first end to an attachment mechanism supported by the chassis of the vehicle and secured at a second end to the connector. In some embodiments, the vehicle mount may comprise a bar, a beam, or the like, and may be operable to be inserted into a hitch receiver of the vehicle. In some embodiments, the vehicle mount may comprise a shape complementary to a shape of the attachment mechanism of the vehicle. In some embodiments, the vehicle mount may comprise a beam or a bar having a substantially square cross section with rounded corners, the beam having a shape, height, and width complementary to a shape, height, and width of a hitch receiver of the vehicle. In some embodiments, the beam may comprise a height and a width, each of approximately 2 inches. In other embodiments, the height and width may each of approximately 1.5 inches. In yet other embodiments, the height and width of the beam may each comprise another similar value.

In other embodiments, the vehicle mount may have a cross-sectional shape comprising at least one of a substantially triangular shape, a heptagonal shape, a hexagonal shape, a circular shape, an "I" shape, an "H" shape, a substantially flat shape, and the like. In some embodiments, the vehicle mount may comprise a hollow interior. In other embodiments, the vehicle mount may be solid. The vehicle mount may comprise any material operable to support the base, the accessory attachment, and the equipment supported by the accessory attachment. In some embodiments, the vehicle mount may comprise at least one of a metal, a metal alloy, carbon fiber, graphene, a strong plastic material, and the like. In some embodiments, the vehicle mount may comprise a protective coating to reduce water damage, rust, and/or to reduce heat transfer when touched by bare skin (i.e., powder coating, galvanizing, and the like).

The vehicle mount may comprise an engagement mechanism for securing the vehicle mount in an engaged position with the hitch receiver of the vehicle. In some embodiments, the engagement mechanism may be complementary to an engagement mechanism of the hitch receiver. In some embodiments, the engagement mechanism of the vehicle mount may comprise a pin (e.g., a linchpin) operable to be inserted into a hole traversing the wall of the hitch receiver and a hole traversing a wall of the vehicle mount. In some embodiments, the vehicle mount may comprise a beam having a plurality of holes spaced along the length of the beam, each of the holes in the beam being arranged such that it may be aligned with (i.e., at the same height as) the hole of the hitch receiver. The vehicle mount may thus be adjusted in length (thereby adjusting the distance that the hitch system extends from the vehicle) by sliding it into or out of the hitch receiver until one of the holes of the beam aligns with the hole of the hitch receiver, and the linchpin being inserted through each. In some embodiments, the linchpin may further comprise a securing member to secure the linchpin in place, the securing member comprising at least one of a cotter pin, a split pin, a snap pin, or the like. In other embodiments, the engagement mechanism may comprise at least one of a clip, a clamp, a press fitting, a tab and slot, a spring button, a snapping collar, a twist-lock, a collar and ball bearings mechanism, and the like. In some embodiments, the securing member may comprise a lock (i.e., a pad lock) to prevent an unauthorized person from removing the pin and stealing the hitch system.

In some embodiments, the second end of the vehicle mount may be permanently attached to the connector via a first attachment point (e.g., via a weld, a rivet, a press fitting, a barb, a frictional or thermo-frictional attachment, and the like). In other embodiments, the second end may be semi-permanently attached to the connector (e.g., via at least one nut and bolt, and the like). In yet other embodiments, the second end may be removably attached to the connector.

Connector

The connector may be operable to secure the support frame to the vehicle mount in an adjustable manner. In some embodiments, the connector may comprise a bracket having first and second attachment points for the vehicle mount and the support frame, respectively. In some embodiments, the bracket may comprise opposing support walls separating an internal space, the internal space comprising a width complementary to a width of at least one of the vehicle mount and the support frame. In some embodiments, the opposing support walls may be connected to each other by at least one cross member. In some embodiments, the cross member may be arranged at a perimeter of the bracket. In some embodiments, the cross member may be operable to provide a stop against the angular movement of the support frame. In some embodiments, the cross member may stop the movement of the support frame in a downward extending position, wherein the distal end of the support frame is positioned at or near ground level. Thus, in embodiments wherein the accessory attachment comprises a ramp, the distal end of the ramp may be supported at or near ground level, and the proximal end of the ramp may be supported at or near a level of the tailgate or back door of the vehicle. In other embodiments, the bracket may comprise a single wall. The connector may comprise any material operable to support the support frame and any accessory attachments secured thereto, as well as the equipment supported by the accessory attachment(s). In some embodiments, the connector may comprise at least one of a metal, a metal alloy, carbon fiber, graphene, a high-strength plastic material, and the like. In some embodiments, the connector frame may comprise a protective coating to reduce water damage, rust, and/or to reduce heat transfer when touched by bare skin (i.e., powder coating, galvanizing, and the like).

In some embodiments, the first attachment point may comprise a static, permanent or semi-permanent engagement between the vehicle mount and the connector. In some embodiments, the first attachment point may comprise at least one bolt and nut. In other embodiments, the first attachment point may comprise at least one of a screw, a weld, a rivet, a press fitting, a frictional connection, and the like.

The second attachment point may comprise a joint which allows the support frame to be adjusted angularly with respect to the vehicle mount. In some embodiments, the angle between the vehicle mount and the support frame may be in a range from approximately parallel with the vehicle mount to approximately orthogonal with the vehicle mount in a first direction (e.g., pointing vertically) to approximately orthogonal with the vehicle mount in a second direction (e.g., pointing directly at the ground) and any angle or range of angles therebetween (e.g., parallel with the vehicle mount, approximately 5 degrees from parallel, approximately 10 degrees from parallel, approximately 15 degrees from parallel, approximately 20 degrees from parallel, approximately 30 degrees from parallel, approximately 45 degrees from parallel, approximately 60 degrees from parallel, approximately 75 degrees from parallel, and the like).

In some embodiments, the second attachment point may comprise a pivot and at least one angular lock, the pivot being operable to allow the support frame to rotate with respect to the vehicle mount, and the at least one angular lock being operable to lock the support frame at an angular position relative to the vehicle mount. In some embodiments, the pivot may comprise an axle traversing the support frame (i.e., traversing the beam of the support frame). In other embodiments, the axle may traverse a lever arm extending from a proximal end of the beam (i.e., a flange extending downwardly from the beam, wherein the flange is secured between the plurality of support walls via the axle, and the beam being supported substantially above or below the axle). In some embodiments, the lever arm may comprise a plurality of flanges extending downwardly from a plurality of edges of the beam, the beam being supported above the axle. In some embodiments, the axle may comprise at least one securing mechanism. In some embodiments, the axle may comprise at least one of a linchpin with a securing cotter pin, a bolt secured by a nut, a pin permanently attached to the bracket (e.g., via a weld or a rivet), rivet, a grommet, another similar mechanism operable to pivotally engage the connector with the support frame, and the like.

In some embodiments, the at least one angular lock may comprise a removable pin operable to traverse a wall of the bracket. In some embodiments, the at least one angular lock may comprise a plurality of holes in a wall of the bracket and at least one removable pin which may be installed through one of the plurality of holes and through a beam of the support frame. In some embodiments, the plurality of holes may be arranged radially about the pivot. In some embodiments, the plurality of holes may be arranged to allow the support frame to be locked at a plurality of different angles relative to the connector. In some embodiments, the plurality of holes may include a hole arranged to lock the support frame in a stored position (e.g., a vertical position). In some embodiments, the stored position may reduce the footprint of the system. In some embodiments, the angular lock may comprise an inwardly biased detent. In some embodiments, the inwardly biased detent may comprise a handle for easily locking or unlocking the support frame in the stored position. In some embodiments, the removable pin may comprise a lock (i.e., a pad lock) to prevent an unauthorized person from removing the pin or adjusting the position of the support frame.

In some embodiments, the removable pin may comprise a quick-release mechanism operable to quickly and easily lock the removable pin in place (i.e., traversing the wall of the bracket), or release the removable pin to be removed from the wall of the bracket. In some embodiments, the quick release mechanism may comprise a detent at an end of the removeable pin. In some embodiments, the detent may be released by engaging a button on a handle of the removable pin. In other embodiments, the at least one angular lock may be integral with the pivot (e.g., a ratcheting mechanism with a twist lock, or a plurality of holes arranged circumferentially around the pivot and at least one spring-loaded pin which is integral with the pivot and is biased against being pulled out of the plurality of holes).

In some embodiments, the connector may be operable to adjust a height of the support frame above the ground. In some embodiments, the connector may comprise a plurality of installation points (e.g., holes in a wall of the bracket) for installing the pivot, the installation points being spaced apart from each other vertically, such that the pivot (and thus the support frame) may be installed at different heights. The system may thus allow for the equipment supported by the accessory attachment to be adjusted to different heights above the ground, which may be useful for raised vehicles, or when utilizing equipment while the equipment is still secured to the accessory attachment (e.g., a grill or the utility basket).

Support Frame

The support frame may comprise any apparatus operable to attach to the connector and secure and support at least one accessory attachment. In some embodiments, the support frame may be operable to secure and support a plurality of accessory attachments. In some embodiments, the support frame may comprise a bar, a beam, or the like, and may be operable to engage with the connector. In some embodiments, the support frame may engage with the connector via the pivot. In some embodiments, the support frame may further engage releasably with the connector via the angular lock, allowing the support frame to change its angle with respect to the connector by swinging about the pivot, and to lock into a particular angle via the angular lock. In other embodiments, the support frame may engage with the connector via a static connection (e.g., at least one of a weld, a nut and bolt, a linchpin, a rivet, and the like).

In some embodiments, the support frame may comprise a shape complementary to a shape of the connector (e.g., a shape of the bracket between the opposing support walls). In some embodiments, the support frame may comprise a beam or a bar having a substantially square cross section with rounded corners, the beam having an outer shape complementary to an inner shape of the connector. In other embodiments, the support frame may have a cross-sectional shape comprising at least one of a substantially triangular shape, a heptagonal shape, a hexagonal shape, a circular shape, an "I" shape, an "H" shape, a substantially flat shape, and the like. In some embodiments, the accessory shape may comprise a hollow interior in order to reduce the weight of the system. In other embodiments, the support frame may be solid to increase the strength of the system. The support frame may comprise any material operable to support the accessory attachment, and the equipment supported by the accessory attachment. In some embodiments, the support frame may comprise at least one of a metal, a metal alloy, carbon fiber, graphene, a high-strength plastic material, and the like. In some embodiments, the support frame may comprise a protective coating to reduce water damage, rust, and/or to reduce heat transfer when touched by bare skin (i.e., powder coating, galvanizing, and the like).

The support frame may comprise at least one engagement mechanism (i.e., a hole complementary to a removable pin) for engaging with the accessory mount of the support frame, the engagement mechanism preventing longitudinal movement of the accessory mount. In some embodiments, the engagement mechanism may comprise at least one hole in the beam of the support frame. In some embodiments, the engagement mechanism may comprise a plurality of holes in the beam of the support frame. In some embodiments, the plurality of holes may comprise at least one hole in a lateral side of the beam and at least one hole in a bottom side of the beam. In some embodiments, the hole in the lateral side of the beam may comprise a pair of aligned holes positioned in opposing lateral walls of the beam, creating a passage traversing the beam from a first lateral side to a second lateral side. In some embodiments, the plurality of holes in the beam may comprise a plurality of holes arranged evenly along a length of the beam on a lateral side thereof.

In some embodiments, the support frame may comprise a first segment and a second segment, the first and second segments being connected to each other at an intermediate point along the length the support frame. The intermediate point may be located at a midpoint of the beam, or at a position which is not midway along the beam (e.g., such that the first segment and second segment are not of equal length). In some embodiments, the first segment may be attached to the connector and may comprise a length greater than a length of the second segment. In some embodiments, the support frame may further comprise three or more segments.

In some embodiments, the first segment and the second segment may not engage directly with each other, only being connected through the folding mechanism described herein (e.g., the ends of the first and second segments may not touch each other directly, or they may simply but up against each other when in the unfolded position). In some embodiments, at least one of the first segment and second segment may comprise an extension at an end thereof, the extension having an outer shape and dimension(s) (i.e., height and width) consistent with the rest of the outer surface of the segment. The extension may comprise an inner shape and inner dimension(s) (i.e., height and width) complimentary to an outer shape and outer dimension(s) of a reduced end of the opposing segment, such that the extension is operable to slide onto the reduced end. In some embodiments, the extension may further comprise an engagement mechanism operable to secure the extension to the reduced end. In some embodiments, the engagement mechanism may comprise a hole in each of the extension and the reduced end, the two holes being operable to align when the extension and reduced end are engaged, and a linchpin operable to be inserted through the holes of each of the extension and reduced end. The engagement mechanism may further comprise a locking device operable to prevent an unauthorized person (i.e., a thief) from removing the extension from the reduced end. In some embodiments, the locking mechanism may comprise at least one of a pad lock, a collar-shaped lock, or another similar lock operable to prevent a pin from being removed from the support frame.

In some embodiments, the extension may further comprise a stabilizer mechanism to reduce play between the extension and the reduced end when the reduced end is engaged with the extension. The stabilizer mechanism may thereby reduce vibrations and undesirable movement of the second segment with respect to the first segment, and subsequently reduce vibration and undesirable movement of any accessory attachment secured on the second segment. In some embodiments, the stabilizer mechanism may comprise any mechanism operable to create lateral pressure between the inner wall of the extension and the outer wall of the reduced end.

In some embodiments, the stabilizer mechanism may comprise a threaded passage in a lateral side of the extension, with a bolt threaded into the passage. The end of the bolt may thereby engage with the outer wall of the reduced end, providing increasing lateral force thereon as the bolt is threaded into the passage of the extension. The bolt may thus increase lateral pressure between the inner wall of the extension and outer wall of the reduced end on the side opposite the bolt. In other embodiments, the stabilizer mechanism may comprise a shim inserted between the inner wall of the extension and the outer wall of the reduced end. In other embodiments, the stabilizer mechanism may comprise gradually increasing outer dimension(s) (i.e., height and width) of the outer wall of the reduced end and/or a gradually reducing dimension(s) (i.e., height and width) of the inner wall of the extension. In yet other embodiments, the stabilizer mechanism may comprise another similar mechanism operable to reduce play between the extension and the reduced end.

Folding Mechanism and Collar

The support frame may comprise a folding mechanism. In some embodiments, the folding mechanism may comprise an offset bracket, the offset bracket comprising a plurality of rotatably engaged members, the members being connected to each other via a pivot traversing each of the members. In some embodiments, the folding mechanism may separate the first segment and the second segment at an intermediate point along the length the support frame. The intermediate point may be located at a midpoint of the beam, or at a position which is not midway along the beam (e.g., such that the first segment and second segment are not of equal length). In some embodiments, the first segment may be attached to the connector and may comprise a length greater than a length of the second segment.

The folding mechanism may thus allow for the second segment to be moved from an unfolded position (i.e., substantially straight or unfolded) into a folded position (i.e., folded back 180 degrees) wherein the support frame has a smaller footprint in the folded position than in the unfolded position. In some embodiments, the folded position may comprise an angle between the first and second segments in a range from approximately 5 degrees to approximately 180 degrees, and any angle or range of angles therebetween (i.e., approximately 15 degrees, approximately 30 degrees, approximately 45 degrees, approximately 60 degrees, approximately 75 degrees, approximately 90 degrees, approximately 105 degrees, approximately 120 degrees, approximately 135 degrees, approximately 150 degrees, approximately 165 degrees, and the like).

In some embodiments, the folding mechanism may comprise a pivot and a fold lock. The pivot may comprise at least one axle allowing a first member and a second member of the folding mechanism to rotate about the axle, and thereby to adjust and angular position relative to each other. In some embodiments, the first member may be attached (either directly or through a collar) to the first segment of the support frame, and the second member may be attached (either directly or via a collar) to the second segment of the support frame. In some embodiments, the axle may comprise at least one of a linchpin with a securing cotter pin, a bolt secured by a nut, a pin permanently attached to the bracket (e.g., via a weld or a rivet), rivet, a grommet, another similar mechanism operable to pivotally engage the first member with the second member, and the like.

In some embodiments, the folding mechanism may comprise a first side and a second side to improve the strength of the folding mechanism. In such embodiments, the first side and second side may each comprise an axle engaged with a first member and a second member of the respective side, the axle of first side being arranged coaxially with the axle of the second side, such that the first side and second side may fold in concert with each other.

In some embodiments, the fold lock may comprise a removable pin operable to traverse at least one member of the folding mechanism. In some embodiments, the fold lock may comprise a plurality of holes in a wall of the member and at least one removable pin which may be installed through one of the plurality of holes. In some embodiments, the plurality of holes may be arranged radially about the pivot. In some embodiments, the plurality of holes may be arranged to allow the second segment to be locked at a plurality of different angles relative to the first segment. In some embodiments, the plurality of holes may include a hole arranged to lock the second segment in an unfolded position (i.e., parallel with and extending in series from the first segment). In some embodiments, the plurality of holes may further include a hole arranged to lock the second segment in a folded position (i.e., parallel with the first segment but folded 180 degrees from the unfolded position). In some embodiments, the folded position may reduce the footprint of the support frame. In some embodiments, the fold lock may comprise an inwardly biased detent. In some embodiments, the inwardly biased detent may comprise a handle for easily locking or unlocking the second segment in the folded or unfolded position. In some embodiments, the fold lock may comprise a secondary lock (i.e., a pad lock or the like) to prevent an unauthorized person from adjusting or stealing the removable pin of the fold lock.

In some embodiments, the removable pin of the fold lock may comprise a quick-release mechanism operable to quickly and easily lock the removable pin in place (i.e., traversing the member of the folding mechanism), or release the removable pin to be removed from the member of the folding mechanism. In some embodiments, the quick release mechanism may comprise a detent at an end of the removeable pin. In some embodiments, the detent may be released by engaging a button on a handle of the removable pin. In other embodiments, the fold lock may be integral with the pivot (e.g., a ratcheting mechanism with a twist lock, or a plurality of holes arranged circumferentially around the pivot and at least one spring-loaded pin which is integral with the pivot and is biased against being pulled out of the plurality of holes).

In some embodiments, the folding mechanism may be permanently or semi-permanently attached at a first side to a collar, and permanently or semi-permanently attached at a second side to an end of a segment of the support frame. The folding mechanism may thereby be operable to change the angular position of the collar with respect to the segment of the support frame. In some embodiments, the folding mechanism may be attached to the collar and the second segment of the support frame, the collar being operable to slide onto and securely engage with the distal end of the first segment of the support mechanism, and the folding mechanism being operable to allow the second segment to fold from an unfolded position (i.e., parallel and extending in series from the first segment) to a folded position (i.e., parallel with the first segment but folded 180 degrees from the working position).

The collar may comprise a shape and inner dimension(s) (i.e., height and width) complementary to an outer shape and dimension(s) (i.e., height and width) of the segment to which it engages (i.e., the collar may fit snugly around the distal end of the first segment. In some embodiments, an inner surface of the collar may comprise a substantially square cross section with rounded corners. In other embodiments, the inner surface of the collar may have a cross-sectional shape comprising at least one of a substantially triangular shape, a heptagonal shape, a hexagonal shape, a circular shape, an "I" shape, an "H" shape, a substantially flat shape, and the like.

In some embodiments, the collar may comprise a shape and inner dimension(s) (i.e., height and width or circumference) complementary to an outer shape and dimension(s) (i.e., height and width or circumference) of a support member of a commercially available hitch system. Thereby, at least a segment of the support frame of the present invention may be operable to securely engage with a commercially available hitch system, or an existing hitch system of a vehicle.

The collar may comprise at least one engagement mechanism (i.e., a hole and a removable pin) for engaging with the segment, the engagement mechanism preventing longitudinal movement of the collar. In some embodiments, the engagement mechanism of the collar may be complementary to an engagement mechanism of the segment (i.e., a hole in the wall the first segment). In some embodiments, a hole in a wall of the collar may be operable to align with a hole in a wall of the segment, such that the removable pin may travers each hole, securing the collar to the segment.

In some embodiments, the engagement mechanism of the collar may comprise a plurality of holes aligned on opposing lateral walls of the collar, and the segment may comprise a plurality of holes aligned opposing lateral walls of the segment, such that the removable pin may be passed through each of the plurality of holes of the collar and each of the plurality of holes of the segment. In some embodiments, the removable pin may comprise a linchpin and a securing member operable to secure the linchpin in place. In some embodiments, the securing member may comprise at least one of a cotter pin, a split pin, a snap pin, or the like. In other embodiments, the removable pin may comprise a bolt and nut. In some embodiments, the removable pin may comprise a comprise a lock (i.e., a pad lock, a collar-shaped lock, and the like) to prevent an unauthorized person (i.e., a thief) from removing the collar from the segment or adjusting the position of the collar. In other embodiments, the engagement mechanism of the collar may comprise at least one of a clip, a clamp, a press fitting, a tab and slot, a spring button, a snapping collar, a twist-lock, a collar and ball bearings mechanism, and the like.

In some embodiments, the collar may further comprise a stabilizer mechanism to reduce play between the collar and the segment when the collar is engaged with the segment. The stabilizer mechanism may thereby reduce vibrations and undesirable movement of the second segment with respect to the first segment, and subsequently reduce vibration and undesirable movement of any accessory attachment secured on the second segment. In some embodiments, the stabilizer mechanism may comprise any mechanism operable to create lateral pressure between the inner wall of the collar and the outer wall of the segment.

In some embodiments, the stabilizer mechanism may comprise a threaded passage in a lateral side of the collar, with a bolt threaded into the passage. The end of the bolt may thereby engage with the outer wall of the segment, providing increasing lateral force thereon as the bolt is threaded into the passage of the collar. The bolt may thus increase lateral pressure between the inner wall of the collar and outer wall of the segment on the side opposite the bolt. In other embodiments, the stabilizer mechanism may comprise a shim inserted between the inner wall of the collar and the outer wall of the segment. In other embodiments, the stabilizer mechanism may comprise a gradually reducing inner dimension(s) of the collar. In yet other embodiments, the stabilizer mechanism may comprise another similar mechanism operable to reduce play between the collar and the segment.

In some embodiments, the fold lock may comprise a removable pin traversing the first support and second support of the pivot. In some embodiments, the fold lock may comprise a plurality of holes traversing the first and second supports of the pivot, the plurality of holes being arranged radially about the axle, and a removable pin which may be installed through the plurality of holes. The placement of the plurality of holes may include locations which allow for the second segment to be locked at a plurality of different angles relative to the first segment. In some embodiments, the plurality of holes may include a hole arranged to lock the second segment in the folded position in order to reduce the footprint of the system.

In some embodiments, the removable pin may comprise a handle and a spring-loaded pin biased against being pulled out of a hole of the plurality of holes (e.g., an inwardly biased detent). The handle of the inwardly biased detent may allow the second segment to be quickly and easily unlocked from the unfolded position, rotated, and locked into the folded position, and vice versa. In other embodiments, the removable pin may comprise a cotter pin. In other embodiments, the fold lock may comprise at least one of a ratcheting mechanism with a twist lock, and a plurality of holes arranged circumferentially around the axle.

In some embodiments, the second segment of the beam may comprise a permanent attachment to the second support of the pivot, and the first support of the pivot may be attached to a collar operable to fit over an end of the first segment of the beam. The collar may be removably attached to the end of the first segment (e.g., via a nut and bolt, a linchpin, and an inwardly biased detent as further described herein). The second segment may therefore be easily and quickly be added or removed from the system (e.g., a removable extension of the support frame). Thus, the system may be customizable with support frames of varying length, depending on the amount and/or size of the equipment to be secured with the system. In some embodiments, the support frame may comprise a third segment. The third segment attached to the second segment via a second pivot.

In some embodiments, the support frame may comprise a plurality of securing mechanisms (e.g., a hole in a wall of the beam having a shape complementary to a shape of a locking pin of the accessory mount). The securing mechanisms may be arranged along a length of the beam of the support frame, such that the accessory attachment may be secured at different points along the length of the support frame. In some embodiments, a plurality of accessory attachments may be secured at a plurality of securing mechanisms along the length of the support frame.

Accessory Mount

The accessory mount may comprise any mechanism operable to secure the accessory support to the support frame. In some embodiments, the accessory mount may be operable to engage with the support frame at any of a plurality of different positions along the length of the support frame. In some embodiments, the accessory mount may comprise a trolley having a collar and at least one support platform, the collar being operable to slide onto an end of the support frame and engage therewith, and the at least one support platform being operable to securely engage with the accessory support such that the accessory support is held in a static position relative to the support frame (i.e., without excessive rocking or rotating during transport).

In some embodiments, the at least one support platform may comprise a single plank. In some embodiments, the plank may have a width greater than a width of the support frame. In some embodiments, the at least one support platform may comprise an engagement mechanism for securely engaging with an accessory support. In some embodiments, the engagement mechanism may comprise a passage in a wall of the at least one platform, the passage being arranged and shaped complementary to an engagement mechanism (i.e., a passage and/or threaded extension) of the accessory support. In some embodiments, the engagement mechanism of the at least one support platform may comprise a passage operable to be aligned with a passage in an accessory support to be secured to the accessory mount, a bolt operable to pass through each such passage, and a nut to secure the bolt in place. In some embodiments, the at least one support platform may comprise a plurality of passages operable to align with a plurality of passages of an accessory support, and a plurality of bolts and nuts operable to secure such passages together.

In some embodiments, the at least one support platform may comprise the single plank, the single plank comprising a substantially rectangular shape and having four engagement mechanisms, one engagement mechanism being located adjacent to each of the four corners of the single plank. The increased width of the at least one plank, and the placement of the four engagement mechanisms, may thereby provide a broad base for mounting the accessory support. The at least one platform may thus prevent or reducing undesirable movement (i.e., rocking, swaying, tipping over, and the like) of the accessory support, and any equipment secured to the accessory support, when the accessory mount is mounted to the support frame.

In some embodiments the accessory support may comprise a plurality of threaded extensions extending from a lower surface of the accessory support, the plurality of threaded extensions being arranged to traverse a plurality of passages in the at least one support platform. The threaded extensions may then be secured in the passages via a plurality of nuts. In other embodiments, the plurality of threaded extensions may extend from an upper surface of the at least one support platform, and the plurality of passages may be arranged a lower surface of the accessory support.

In other embodiments, the at least one support platform may comprise a plurality of support members extending up from the collar in order to provide a wide base for statically mounting the accessory support. In some embodiments, the plurality of support members may comprise a first support member and a second support member, the first and second support members extending upwardly from the collar and diagonally away from each other, forming a Y-shape (wherein the collar comprises the stem of the Y) support for engaging with the accessory mount. In some embodiments, the upper ends of each of first and second support members may comprise a substantially horizontal extension, each of the horizontal extensions comprising at least one engagement mechanism for securing the accessory mount. In some embodiments, first and second support members may each comprise a plurality of engagement mechanisms (i.e., two or more) spaced apart on the horizontal extension. The plurality of support members may thereby provide a broad, substantially square overall support base for mounting the accessory support, operable to prevent or reduce undesirable movement (i.e., rocking, swaying, tipping over, and the like) of the accessory support, and any equipment secured to the accessory support, when the accessory mount is mounted to the support frame.

In some embodiments, the collar may comprise an inner layer and an outer layer. In some embodiments, the outer layer may comprise a thin sleeve of high strength material (i.e., at least one of a metal, a metal alloy, carbon fiber, graphene, a strong plastic material, and the like), the sleeve being operable to support the at least one support platform. In some embodiments, the sleeve may be integral with the at least one support platform. In other embodiments, the at least one support platform may be permanently or semi-permanently attached to the sleeve (i.e., via at least one of a weld, a rivet, a press fitting, a barb, a frictional or thermo-frictional attachment, and the like). The sleeve may provide weather-resistant and/or UV-resistant protection for the inner layer, thus preventing or reducing wear and breakdown of the material of the inner layer. In some embodiments, the sleeve and the at least one support platform may comprise a protective coating to reduce water damage, rust, and/or to reduce heat transfer when touched by bare skin (i.e., powder coating, galvanizing, and the like).

The inner layer may comprise a shape operable to provide a tight, secure fit on the beam of the support frame. In some embodiments, a shape and dimension(s) (i.e., height and width) of an inner surface of the inner layer may be complementary to a shape and dimension(s) (i.e., height and width) of an outer surface of the beam of the support frame. In some embodiments, the inner surface of the inner layer may comprise a substantially square shape. In some embodiments, the inner surface of the inner layer may comprise a substantially square cross section with rounded corners. In some embodiments, the corners of the substantially square cross section may each comprise a rounded cutout, wherein the rounded cutouts may be operable to allow the accessory mount to more easily slide onto the support frame. In other embodiments, the inner surface of the inner layer may have a cross-sectional shape comprising at least one of a substantially triangular shape, a heptagonal shape, a hexagonal shape, a circular shape, an "I" shape, an "H" shape, a substantially flat shape, and the like.

In some embodiments, the inner surface of the inner layer may comprise a shape and inner dimension(s) (i.e., height and width or circumference) complementary to an outer shape and dimension(s) (i.e., height and width or circumference) of a support member of a commercially available hitch system. Thereby, the accessory attachment of the present invention may be operable to securely engage with a commercially available hitch system, or an existing hitch system of a vehicle.

In some embodiments, the inner layer may comprise at least one of a metal, a metal alloy, carbon fiber, graphene, a strong plastic material, and the like. In some embodiments, the inner layer may comprise a material operable to slide onto the beam without damaging or substantially wearing down the outer surface of the beam or a protective coating (i.e., powder coating or galvanizing) on the outer surface of the beam, while retaining sufficient compression strength to securely support the weight of the accessory mount, the accessory support, and any equipment secured to the accessory support. In some embodiments, the inner layer may comprise an acetal homopolymer (e.g., Delrin®), or similarly strong but non-damaging material.

In some embodiments, the sleeve may comprise an attachment mechanism for securely attaching to the inner layer. In some embodiments, the attachment mechanism may traverse the outer layer and pierce at least a portion of the inner layer. In some embodiments, the attachment mechanism may comprise at least one of a tab, a pin, a nail, a screw, a rivet, a press fitting, a barb, and the like. In some embodiments, the sleeve may comprise a plurality of attachment mechanisms. In some embodiments, the plurality of attachment mechanisms may be arranged on a plurality of sides of the sleeve. In some embodiments, the plurality of attachment mechanisms may comprise four rivets arranged near four corners of a first side of the sleeve, and four rivets arranged near four corners of a second side of the sleeve, the first side being opposite the second side.

In other embodiments, the accessory mount may comprise a clip (e.g., a C-shaped support) operable to fit over the support frame (e.g., slide onto the support from the top or lateral side thereof) and engage with an engagement mechanism of the support frame. In yet other embodiments, the accessory mount may comprise another similar shape which does not entirely surround an outer surface of the support frame.

The accessory mount may comprise an engagement mechanism for securing the accessory mount in an engaged position with the support frame. In some embodiments, the engagement mechanism may be complementary to an engagement mechanism of the support frame. In some embodiments, the engagement mechanism of the accessory mount may comprise a pin (e.g., a linchpin) operable to be inserted into a hole traversing a wall of the collar and a hole traversing a wall of the support frame. In some embodiments, the collar of the accessory mount and the beam of the support frame may each comprise complementary passages arranged on opposing sides of the collar or beam, respectively, such that the linchpin may traverse the collar and beam entirely. In some embodiments, the support frame may comprise a beam having a plurality of holes spaced along the length of the beam, each of the holes in the beam being arranged such that it may be aligned with (i.e., at the same height as) the hole of the accessory mount. The accessory mount may thus be adjusted to and secured at a plurality of different positions along the length of the support frame, thereby adjusting the position of the accessory support and any equipment secured therein. In some embodiments, the linchpin may further comprise a securing member to secure the linchpin in place, the securing member comprising at least one of a detent, a cotter pin, a split pin, a snap pin, or the like.

In some embodiments, the linchpin may comprise a detent at an end of the linchpin. In some embodiments, the detent may be released by engaging a button on a handle of the removable pin. In other embodiments, the engagement mechanism may comprise at least one of a bolt and nut, a clip, a clamp, a press fitting, a tab and slot, a spring button, a snapping collar, a twist-lock, a collar and ball bearings mechanism, and the like. In some embodiments, the engagement mechanism may comprise a lock (i.e., a pad lock, a collar-shaped lock, and the like) to prevent an unauthorized person from removing the linchpin and stealing the accessory attachment.

In some embodiments, the accessory mount may further comprise a stabilizer mechanism to reduce play between the collar and the beam of the support frame when the collar is engaged with the beam. The stabilizer mechanism may thereby reduce vibrations and undesirable movement of the accessory attachment with respect to the support frame. The stabilizer mechanism may comprise any mechanism operable to create lateral pressure between the inner wall of inner layer of the collar and the outer wall of the beam.

In some embodiments, the stabilizer mechanism may comprise a threaded passage in a lateral side of the collar, with a bolt threaded into the passage. The end of the bolt may thereby engage with the outer wall of the beam, providing increasing lateral force thereon as the bolt is threaded into the passage of the collar. The bolt may thus increase lateral pressure between the inner wall of the collar and outer wall of the beam on the side opposite the bolt. In other embodiments, the stabilizer mechanism may comprise a shim inserted between the inner wall of the collar and the outer wall of the beam. In other embodiments, the stabilizer mechanism may comprise gradually reducing dimension(s) (i.e., height and width) of the inner wall of the inner layer of the collar. In yet other embodiments, the stabilizer mechanism may comprise another similar mechanism operable to reduce play between the collar and the beam.

Accessory Support

The accessory support may comprise any mechanism operable to securely support a piece of equipment and secure the equipment to the vehicle hitch system via the accessory mount, or, in embodiments wherein the accessory support comprises a ramp, the ramp may be operable to provide support to a person or animal moving up or down the ramp. In some embodiments, the accessory support may comprise a support member for supporting the piece of equipment (or person or animal) and an engagement mechanism for securing the accessory support to the accessory mount. In some embodiments, the accessory support may further comprise a securing mechanism for securing the piece of equipment to the support member or providing grip for the animal or person moving up or down the ramp embodiment.

In some embodiments, the accessory support may be removably attached to the accessory mount (i.e., the engagement mechanism may comprise at least one nut and bolt, a screw, a clip, a clamp, and the like). In other embodiments, the accessory support may be permanently attached to the accessory mount (i.e., the engagement mechanism may comprise at least one of a weld, a rivet, a press fitting, a frictional or thermo-frictional attachment, and the like). In some embodiments, the accessory mount may not comprise the at least one platform, and the accessory support may be connected directly to the collar or clamp of the accessory mount.

The support member may comprise any mechanism operable to support the weight of a piece of equipment (or person or animal) being supported by the accessory support. In some embodiments, the support member may comprise a shape complementary to a shape of the piece of equipment to be secured thereto. In other embodiments, the support member may have a shape comprising at least one of: a channel for supporting a tire of a bike or motorcycle; a platform for supporting a grill; a utility basket for supporting a cooler and/or other various generally cubic or generally cylindrical pieces of equipment (i.e., a tackle box, a thermos, a tent bag, a sleeping bag, a suitcase, etc.); a slot for supporting a ski, a snowboard, a surfboard, a wakeboard, a paddleboard, and the like; a ramp operable to support an animal or person walking up or down the ramp; and another similar shape for supporting a piece of equipment or an animal or person.

In some embodiments, the support member may comprise a clamp having opposing arms, the clamp being operable to securely support at least one of a ski, a snowboard, a wakeboard, a paddleboard, and the like. In other embodiments, the support member may comprise a mildly curving bar having a shape complementary to a shape of a canoe, a kayak, a small boat, and the like. In some embodiments, the mildly curving bar may comprise a pad, cushion, or the like, to prevent damaging a surface of the piece of equipment secured thereto. In some embodiments, the support member may comprise a slot having a shape complementary to a shape of at least one of a fishing pole, a firearm, and another similar piece of fishing or hunting equipment.

In some embodiments, the support member may comprise a track, a ramp and/or a platform having a shape complementary to a shape of a tire of an off-road vehicle (i.e., a tire of a motorcycle, an ATV, a three-wheel vehicle). In other embodiments, the support member may comprise a ramp and/or platform having a shape complementary to a wheelbase of a piece of landscaping equipment, such as a push-mower or a ride-on mower. In yet other embodiments, the support member may comprise a shape operable to support a collapsible living space (i.e., a tent or a pop-up shelter) for camping or overland use (i.e., a large, generally rectangular frame supported behind or above the bed of a truck). In some embodiments, the support member may be operable to support a plurality of pieces of equipment. In some embodiments, the support member may comprise a plurality of shapes complementary to the shapes of a plurality of pieces of equipment.

The securing mechanism may comprise any apparatus operable to secure a piece of equipment to the accessory support, or in embodiments wherein the accessory support comprises a ramp, provide grip for a piece of equipment, an animal, or a person moving up or down the ramp. The securing mechanism may be tailored to secure a particular type or piece of equipment. In some embodiments, the securing mechanism may comprise a shape complementary to a shape of the piece of equipment to be secured to the accessory support. In some embodiments, the securing mechanism may comprise at least one of: an elastic web for holding items in a utility basket; a strap operable to wrap around a ski, a snowboard, a wakeboard, a surfboard, a canoe, a kayak, a small boat, a fishing pole, a firearm, a lawnmower, a weed-eater, a leaf-blower, a cooler, and the like; a wheel clamp (i.e., a spring-loaded bar having a curved end for fitting over a wheel) for securing a bicycle or motorcycle in place; at least one of a flange, a clamp and a bolt and nut for securing a bar-b-que; a high-friction surface (i.e., similar to sandpaper) and/or a gripping member (i.e., a low-profile board arranged longitudinally from left to right across the surface) for providing grip on an upper surface of a ramp, and the like. The securing member may comprise any material appropriate for the particular application of the securing member (i.e.: rubber, bungee cord, or other elastic material for a strap or web; and a metal, metal alloy, carbon fiber, graphene, of high-strength plastic for the wheel mount, clamp, and gripping member).

A method of using the hitch system of the present invention may comprise the steps of: providing a system for attaching to a hitch receiver of a vehicle, the system comprising a vehicle mount, a connector, a support frame, and an accessory attachment, wherein the vehicle mount is operable to engage with the hitch receiver, the connector is operable to rotatably connect the support frame to the vehicle mount, and the accessory attachment is operable to releasably and adjustably engage with the support frame; and engaging the vehicle mount with the hitch receiver.

In some embodiments, the method may further comprise the step of adjusting an angle of the support frame with respect to the vehicle mount. In some embodiments, the method may further comprise the step of adjusting the angle of the support frame from a working position to a storage position. In some embodiments, the method may further comprise the step of adjusting a position of the accessory mount along the length of the support frame. In some embodiments, the support frame may comprise a beam having a first segment and a second segment, and the method may further comprise the step of connecting the second segment to the first segment. In some embodiments, the support frame may comprise a beam having a folding mechanism, and the method may further comprise the step of folding the beam from an unfolded position to a folded position. In some embodiments, the method may further comprise the step of engaging a second accessory attachment on the beam of the support frame. In some embodiments, the beam may further comprise a third segment and the method may further comprise the step of attaching the third segment to the second segment. In some embodiments, the method may further comprise the step of adding a third accessory attachment to the beam of the support frame. In some embodiments, the method may further comprise the step of engaging a stabilizer mechanism of the second segment of the beam. In some embodiments, the method may further comprise the step of engaging a stabilizer mechanism of the accessory attachment.

These and other features and objects of the invention will be apparent from the description provided herein.

It is an object of the present invention to provide a vehicle hitch system operable to secure a piece of equipment for transport when the equipment cannot otherwise fit in or on the vehicle.

It is a further object of the present invention to provide a vehicle hitch system which allows for a piece of equipment to be utilized in conjunction with a vehicle which could not otherwise use the equipment, such a grill secured to the hitch system of a vehicle without a tailgate.

It is a further object of the present invention to provide a vehicle hitch system which allows for persons or animals to more easily climb into the back cargo space or bed of a vehicle.

It is a further object of the present invention to provide a vehicle hitch system which is adaptable, allowing for a plurality of different modular accessory attachments to be added or removed from the system, the plurality of different accessory attachments being able to secure a plurality of different types of equipment to the vehicle.

It is a further object of the present invention to provide a vehicle hitch system which is adjustable in length and in the angle of the support frame relative to the ground.

It is a further object of the present invention to provide a vehicle hitch system which is more easily stored and takes up less space than a plurality of different hitch systems, each designed to secure a different type of equipment.

It is a further object of the present invention to provide a vehicle hitch system which is secured from theft or adjustment by unauthorized persons.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 4 provides side views (see top) and a top-down view (see bottom) of an accessory mount of a vehicle hitch system, according to an embodiment of the present invention.

FIG. 5 provides side views (see top and middle) and a perspective view (see bottom) of an accessory mount of a vehicle hitch system, according to an embodiment of the present invention.

FIG. 9 provides perspective (see top) and side (see bottom) views of a vehicle hitch system, according to an embodiment of the present invention.

FIG. 14 provides side (see top), top-down (see middle), and front (see bottom) views of a vehicle hitch system, according to an embodiment of the present invention.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Figure 1A:
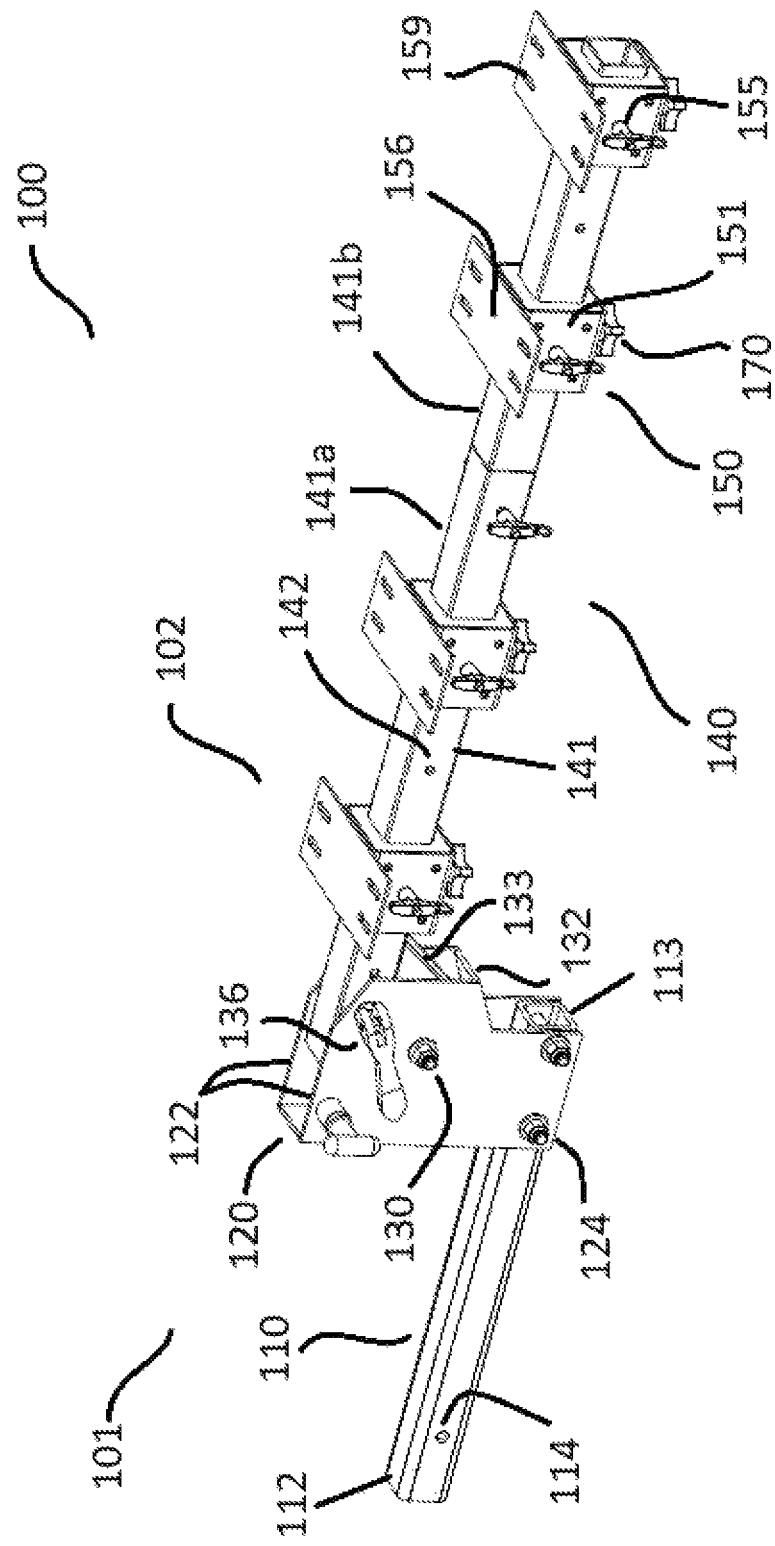
FIG. 1A provides a perspective view of a vehicle hitch system, according to an embodiment of the present invention.
Figure 2:
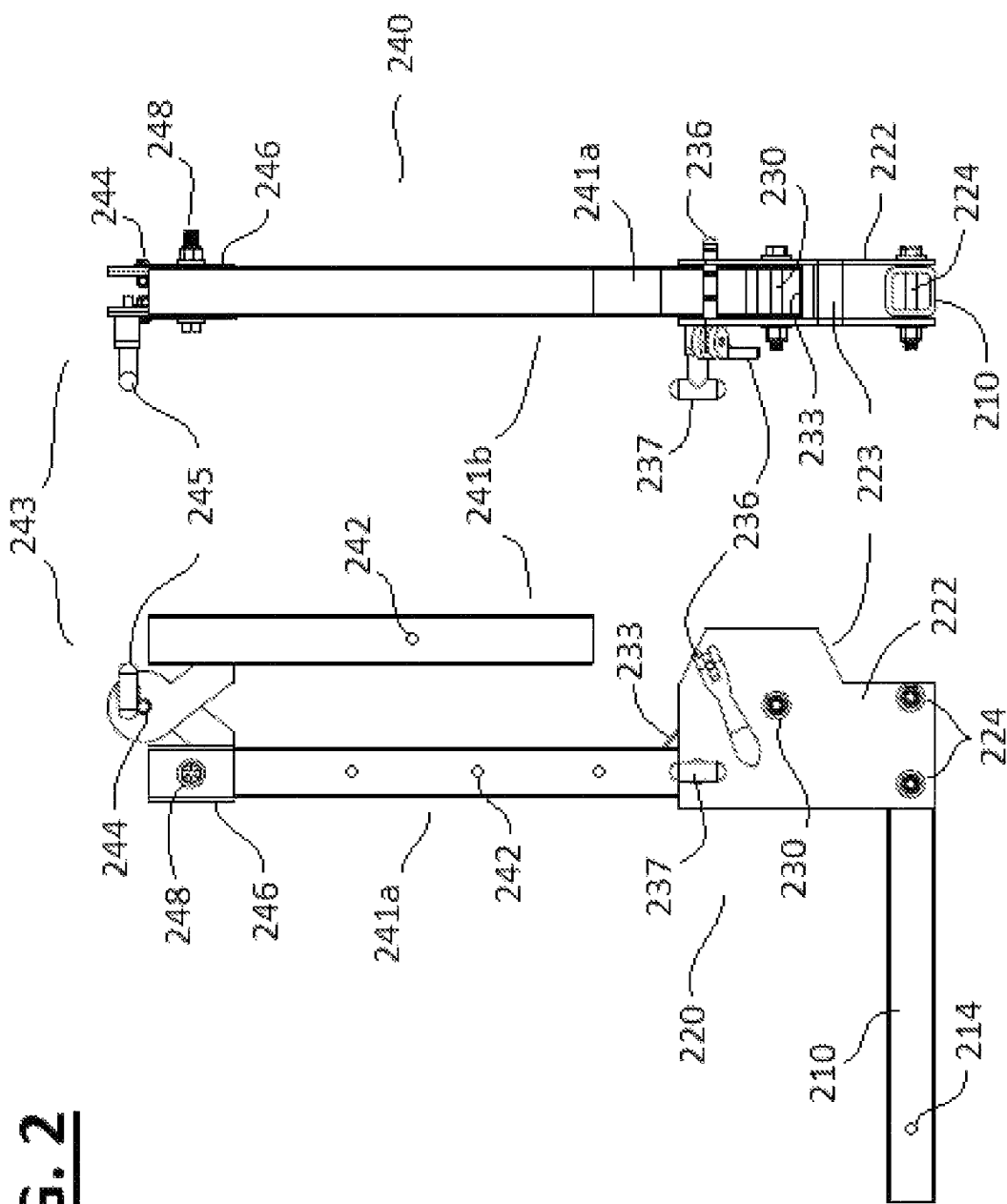
FIG. 2 provides side (see left) and front (see right) views of a vehicle hitch system, according to an embodiment of the present invention.
Figure 3:
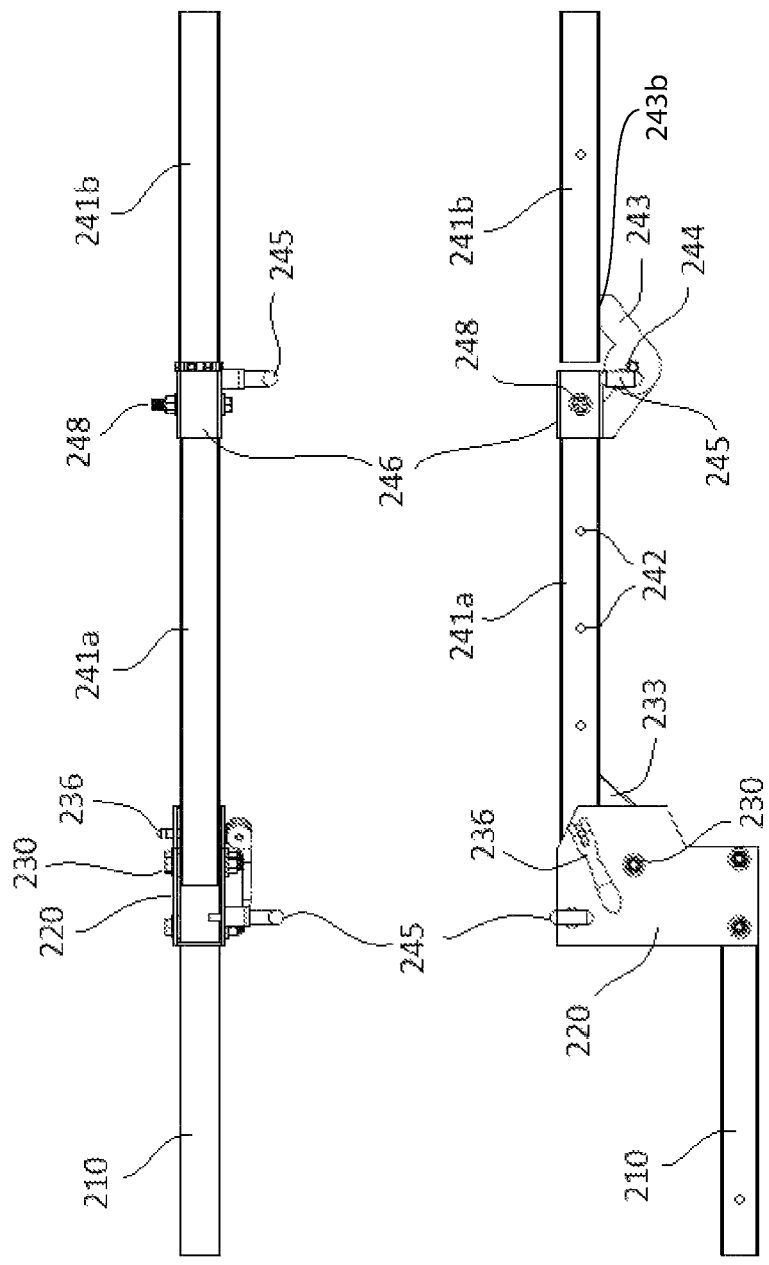
FIG. 3 provides top-down (see top) and side (see bottom) views of a vehicle hitch system, according to an embodiment of the present invention.

The present invention concerns a modular hitch system for securing one or more pieces of equipment. As seen in FIGS. 1-3 the system 100 may include the following major components: a base 101 and a plurality of different accessory attachments 102, the base 101 comprising a vehicle mount 110, a connector 120, and a support frame 140, and each of the accessory attachments 102 may comprise an accessory mount 150 and an accessory support 160.

The vehicle mount 110 may comprise a support beam operable to be secured at a first end 112 to a hitch receiver of a vehicle (not shown) and secured at a second end 113 to the connector 120. The vehicle mount 110 may comprise a beam having a substantially square cross section with rounded corners, the beam having a shape, height, and width complementary to a shape, height, and width of the hitch receiver of the vehicle. The beam may comprise a height and a width, each of approximately 2 inches, or approximately 1.5 inches. The vehicle mount 110 may comprise an engagement mechanism 114 (i.e., a hole for a removable pin) for securing the vehicle mount 110 in an engaged position with the hitch receiver of the vehicle. The engagement mechanism 114 may be complementary to an engagement mechanism (i.e., a linchpin) of the hitch receiver. The second end 113 of the vehicle mount 110 may be permanently attached to the connector 120 via a first attachment point 124 (i.e., a bolt and nut).

The connector 120 may comprise a bracket having first 124 and second 130 attachment points for the vehicle mount 110 and the support frame 140, respectively. The connector 120 may comprise opposing support walls 122 separating an internal space, the internal space comprising a width complementary to a width of the vehicle mount 110 and the support frame 140. The opposing support walls 122 may be connected to each other by at least one cross member 123. The cross member 123 may be arranged at a perimeter of the connector 120. The cross member 123 may be operable to provide a stop against the angular movement of the support frame 140. The cross member 123 may stop the movement of the support frame 140 in a downward extending position, wherein the distal end of the support frame 140 is positioned at or near ground level. Thus, in embodiments wherein the accessory attachment 102 comprises a ramp (see FIG. 7), the distal end of the ramp may be supported at or near ground level, and the proximal end of the ramp may be supported at or near a level of the tailgate or back door of the vehicle.

The second attachment point 130 may comprise a pivot which allows the support frame 140 to be adjusted angularly with respect to the vehicle mount 110. The pivot may comprise an axle 132 traversing a lever arm 133 extending from a proximal end of the beam 141 of the support frame 140. The lever arm 133 may comprise a bracket extending downwardly from the beam 141, the bracket being secured between the plurality of support walls 122 via the axle 132, and the beam 141 being supported substantially above the axle 132 when in the working position. The axle 132 may comprise a bolt secured by a nut.

The connector 120 may further comprise an angular lock 135 operable to lock the support frame 140 at an angular position relative to the vehicle mount 110. The angular lock 135 may comprise a removable pin 136 operable to traverse a wall 122 of the connector 120 via one of a plurality of holes in a wall 122 of the connector 120. The plurality of holes may be arranged radially about the pivot 130 to allow the support frame 140 to be locked at either of a stored position (e.g., a vertical position; see FIG. 2) or a working position (e.g., substantially horizontal; see FIG. 3). The connector 120 may further comprise an inwardly biased detent operable to lock the support frame 140 in the stored position. The inwardly biased detent may comprise a handle for easily locking or unlocking the support frame 140 in the stored position. The removable pin 136 may comprise a lock (i.e., a pad lock) to prevent an unauthorized person from removing the pin 136 or adjusting the position of the support frame 140.

The support frame 140 may be operable to secure and support a plurality of accessory attachments 102. The support frame 140 may comprise a substantially square shape with rounded corners, the shape being complementary to a shape of the connector 120 (e.g., a shape of the internal space between the opposing support walls 122). The support frame 140 may comprise a plurality of engagement mechanisms 142 (i.e., holes complementary to a removable pin) for engaging with the accessory mount 150, the engagement mechanism 142 preventing longitudinal movement of the accessory mount 150 along the beam 141. The plurality of engagement mechanisms 142 in the beam 141 may comprise a plurality of holes arranged evenly along a length of the beam 141.

The support frame 140 may comprise a first segment 141a and a second segment 141b, the first and second segments being connected to each other at an intermediate point along the length the support frame 140. The first segment 141a may be attached to the connector 120 and may comprise a length greater than a length of the second segment 141b.

Figure 1B:
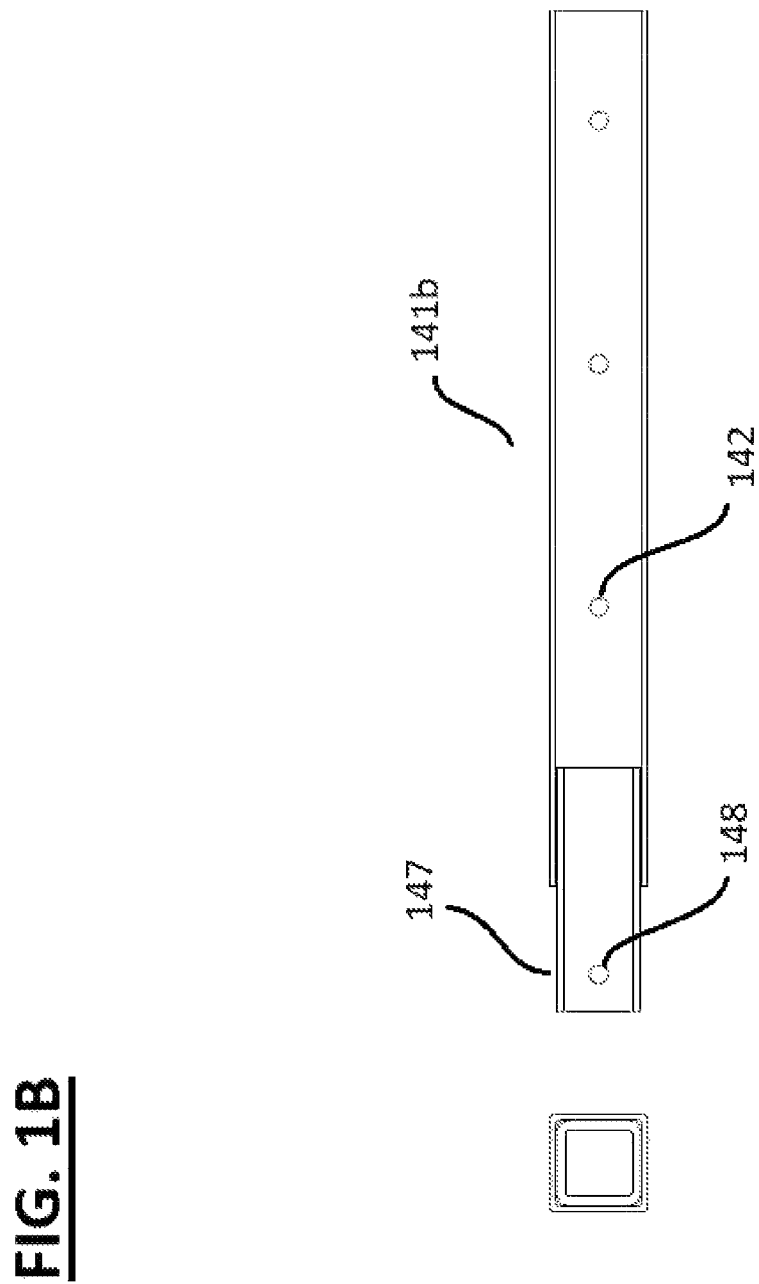
FIG. 1B provides front (see left) and side (see right) views of a support frame of a vehicle hitch system, according to an embodiment of the present invention.

As best seen in FIG. 1B, the second segment 141b may comprise a reduced end 147 having an outer shape, height, and width complementary to a shape, height, and width of an inner surface of the distal end of the first segment 141a, such that the reduced end 147 is operable to slide into the distal end of the first segment 141a. The reduced end 147 may comprise an engagement mechanism 148 (i.e., a hole for a linchpin) operable to secure the reduced end 147 in the distal end of the first segment 141a. The engagement mechanism 148 may further comprise a locking device operable to prevent an unauthorized person from removing the second segment 141b from the first segment 141a. In some embodiments, the support frame 140 may comprise three or more segments (see FIG. 8).

As seen in FIGS. 2, 3, and 6-8, in another embodiment, the first segment 241a and the second segment 241b may not engage directly with each other, only being connected through a folding mechanism 243. The folding mechanism 243 may comprise a pair of offset brackets, the pair of offset brackets each comprising a plurality of rotatably engaged members. The members may be connected to each other via a pivot 244 traversing each of the members. The pivot 244 of each of the offset brackets may comprise a bolt secured by a nut. The folding mechanism 243 may thus allow for the second segment 241b to be moved from an unfolded position (i.e., substantially straight or unfolded; see FIG. 3) into a folded position (i.e., folded back 180 degrees; see FIG. 2) wherein the support frame 240 has a smaller footprint in the folded position than in the unfolded position.

The folding mechanism 243 may further comprise fold lock 245 comprising a pin operable to traverse one of a plurality of holes in a wall of at least one support member of the fold mechanism 243. The plurality of holes may be arranged radially about the pivot 244, allowing for the second segment 241b to be locked at a plurality of different angles relative to the first segment 241a. The plurality of holes may include a first hole arranged to lock the second segment 241b in an unfolded position and a second hole arranged to lock the second segment 241b in a folded position. The pin of the fold lock 245 may comprise an inwardly biased detent having a handle for easily locking or unlocking the second segment 241b in the folded or unfolded position. The fold lock may comprise a secondary lock (i.e., a pad lock or the like) to prevent an unauthorized person from adjusting fold lock 245.

The folding mechanism 243 may be attached to the collar 246 and the second segment 241b of the support frame 240, the collar 246 being operable to slide onto and securely engage with the distal end of the first segment 241a of the support frame 240, and the folding mechanism 243 being operable to allow the second segment 241b to fold from an unfolded position to a folded position. The collar 246 may comprise an inner shape complementary to an outer shape of the distal end of the first segment 241a. The inner shape of the collar 246 may comprise a substantially square cross section with rounded corners.

The collar 246 may comprise at least one engagement mechanism 248 (i.e., a hole and a removable pin) for engaging with an engagement mechanism 242 (i.e., a hole) of the first segment 241a, the engagement mechanism 248 preventing longitudinal movement of the collar 246 along the length of the first segment 241a. The engagement mechanism 248 of the collar 246 may be complementary to, and operable to align with, the engagement mechanism 242 of the first segment 241a, such that a removable pin (i.e., a bolt) may traverse each of the collar 246 and the first segment 241a. The removable pin may comprise a locking mechanism to prevent an unauthorized person from removing the collar from the segment or adjusting the position of the collar. The collar 246 may further comprise a stabilizer mechanism (see, i.e., reference 170) to reduce play between the collar 246 and the first segment 241a when the collar 246 is engaged with the first segment 241a. The stabilizer mechanism may comprise a threaded passage in the lower side of the collar 246, with a bolt threaded into the passage and engaging with a lower side of the first segment 241a.

The fold lock 245 may comprise a removable pin traversing one of a plurality of holes in the first support and second support of the pivot 244, the plurality of holes being arranged radially about the axle 244. The placement of the plurality of holes may include locations which allow for the second segment 241b to be locked at a plurality of different angles relative to the first segment 241a, including an unfolded position (see FIG. 3) and a folded position (see FIG. 2). The removable pin may comprise a handle and a spring-loaded pin biased against being pulled out of a hole of the plurality of holes (e.g., an inwardly biased detent).

The second segment 241b may comprise a permanent attachment to a second support 243b of the folding mechanism 243, and the collar 246 may comprise a permanent attachment to the first support 243a, the collar 246 being operable to fit over and securely engage with the distal end of the first segment 241a. The second segment 241b may therefore be easily and quickly added or removed from the system 200 (i.e., a removable extension of the support frame 240). Thus, the system may be customizable with a support frame 240 of varying length, depending on the amount and/or size of the equipment to be secured with the system. The support frame 240 may further comprise a third segment 241c (see FIG. 8). The third segment 241c being attached to the second segment 241b via a second pivot 246b.

As seen in FIG. 4, the accessory mount 150 may comprise any mechanism operable to secure the accessory support 160 to the support frame 140. The accessory mount may be operable to engage with the support frame 140 at any of a plurality of different positions (see 142) along the length of the beam 141 of the support frame 140. The accessory mount 150 may comprise a trolley having a collar 151 and at least one support platform 156, the collar 151 being operable to slide onto an end of the beam 141 and engage therewith an engagement mechanism 142 thereof, and the at least one support platform 156 being operable to securely engage with the accessory support 160 such that the accessory support 160 is held in a static position relative to the support frame 140 (i.e., without excessive rocking or rotating during transport).

The at least one support platform 156 may comprise a single plank having a width greater than a width of the beam 141, and a plurality of engagement mechanisms 159 for securely engaging with an accessory support 160. The engagement mechanism may comprise a passage in a wall of the at least one platform 156, the passage being arranged and shaped complementary to an engagement mechanism (i.e., a passage and/or threaded extension) of the accessory support 160. The plurality of engagement mechanisms 159 may comprise four engagement mechanisms, each being located adjacent to one of the four corners of the single plank. The single plank may thereby provide a broad base for mounting the accessory support 160, preventing or reducing undesirable movement (i.e., rocking, swaying, tipping over, and the like) of the accessory support 160 and any equipment supported by the accessory support 160.

The collar 151 may comprise an inner layer 153 and an outer layer 152, the outer layer 152 comprising a thin sleeve of high strength material (i.e., a metal) and being operable to support the at least one support platform 156. The outer layer 152 may comprise a plurality of attachment mechanisms 152a for securely attaching to the inner layer 153, the attachment mechanisms 152a each comprising a screw operable to traverse the outer layer 152 and pierce at least a portion of the inner layer 153.

The outer layer 152 may provide weather-resistant and/or UV-resistant protection for the inner layer 153, thus preventing or reducing wear and breakdown of the material of the inner layer 153, which may comprise a material operable to slide onto the beam 141 without damaging or substantially wearing down the outer surface of the beam 141 or a protective coating (i.e., powder coating or galvanizing) thereon. The inner layer 153 may comprise an acetal homopolymer material (e.g., Delrin®). The inner layer 153 may comprise a shape operable to provide a tight, secure fit on the beam 141. The inner surface of the inner layer 153 may comprise a substantially square cross section with cutout rounded corners 154, the cutout rounded corners 154 being operable to allow the accessory mount 150 to more easily slide onto the beam 141 of the support frame 140.

The accessory mount 150 may comprise an engagement mechanism 155 for securing the accessory mount 150 in an engaged position on the support frame 140. The engagement mechanism 155 of the accessory mount 150 may comprise a removable pin (e.g., a linchpin) operable to be inserted into a hole traversing a wall of the collar 151 and a hole 142 traversing a wall of the beam 141 of the support frame 140. The beam 141 may comprise a plurality of holes 142 spaced along its length, each of the holes 142 being arranged such that it may be aligned with (i.e., at the same height as) the engagement mechanism 155 of the accessory mount 150. The accessory mount 150 may thus be adjusted to and secured at a plurality of different positions along the length of the beam 141, thereby also adjusting the position of the accessory support 160 and any equipment secured thereon. In some embodiments, the engagement mechanism 155 may further comprise a detent 155a at a distal end thereof, the detent 155a being operable to be released by engaging a button 155b on a handle of the removable pin.

The accessory mount 150 may further comprise a stabilizer mechanism 170 to reduce play between the collar 151 and the beam 141 of the support frame 140 when the collar 151 is engaged with the beam 141. The stabilizer mechanism 170 may comprise a threaded passage in the lower side of the collar 151, with a bolt threaded into the passage. The end of the bolt may thereby engage with the lower wall of the beam 141, providing increasing lateral force thereon as the bolt is threaded into the passage of the collar 151.

As seen in FIG. 5, in another embodiment, the at least one support platform may comprise a plurality of support members 357 extending up from the collar 351 in order to provide a wide base for statically mounting the accessory support 160. The plurality of support members 357 may comprise a first support member and a second support member, the first and second support members extending upwardly from the collar 351 and diagonally away from each other, forming a Y-shape support for engaging with the accessory mount 160. The upper ends of each of first and second support members may comprise a substantially horizontal extension 358, each of the horizontal extensions 358 comprising a pair of engagement mechanisms 359 spaced apart on the horizontal extension 358. The plurality of support members 357 may thereby provide a broad, substantially square overall support base for mounting the accessory support 160, operable to prevent or reduce undesirable movement (i.e., rocking, swaying, tipping over, and the like) of the accessory support 160 any equipment (or animal or person) supported by the accessory support 350 when mounted to the support frame 140.

As seen in FIGS. 6-14, the accessory support 160 may comprise a support member 161 for supporting a piece of equipment (or person or animal) thereon and an engagement mechanism 162 for securing the accessory support to the accessory mount 150/350. The accessory support 160 may further comprise a securing mechanism 163 for securing the piece of equipment to the support member 161 or providing grip for the animal or person moving up or down accessory support 160 (see FIG. 7). The accessory support 160 may be removably attached to the accessory mount 150/350, i.e. the engagement mechanism 162 may comprise a plurality of nuts and bolts.

Figure 6:
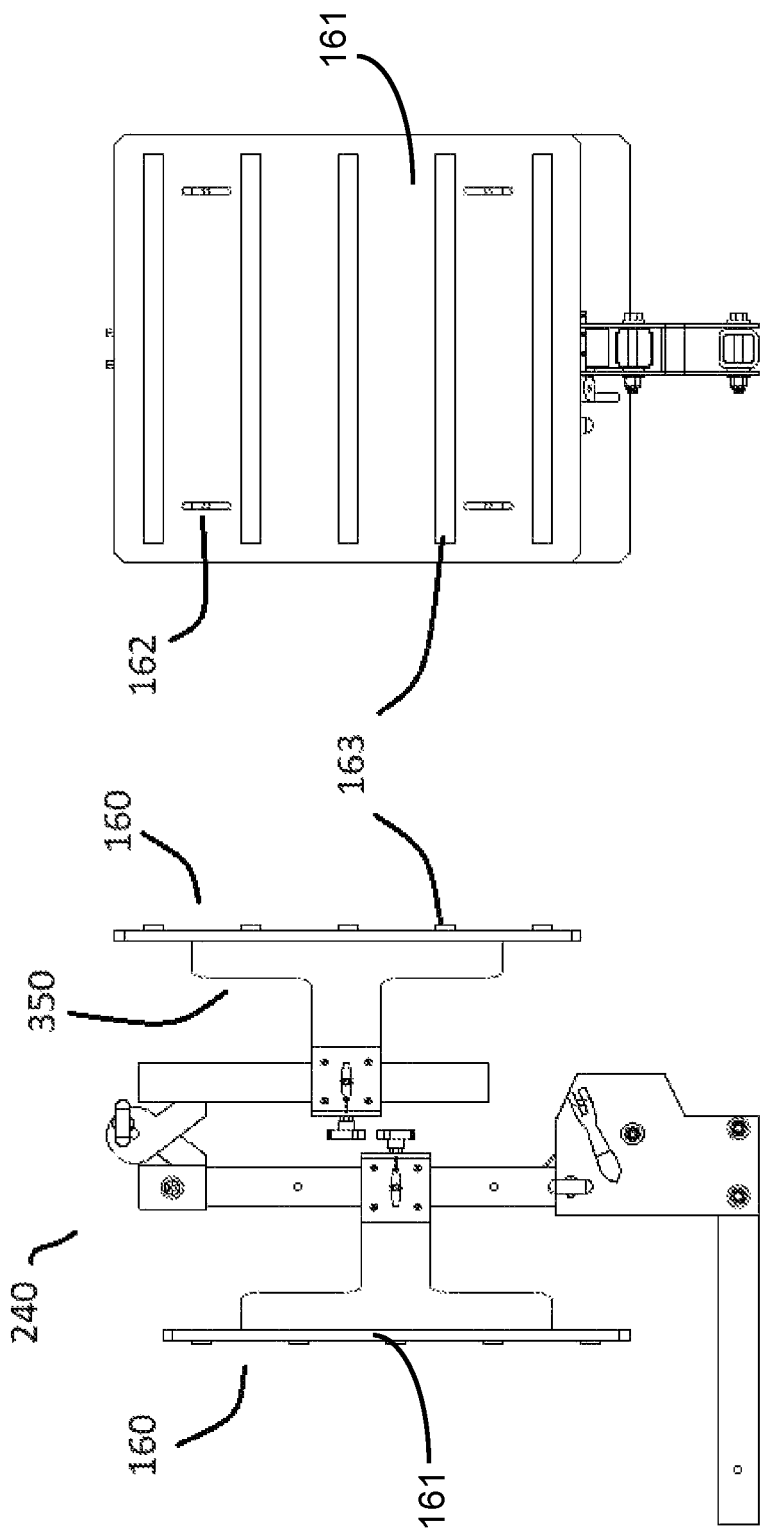
FIG. 6 provides side (see left) and front (see right) views of a vehicle hitch system, according to an embodiment of the present invention.
Figure 7:
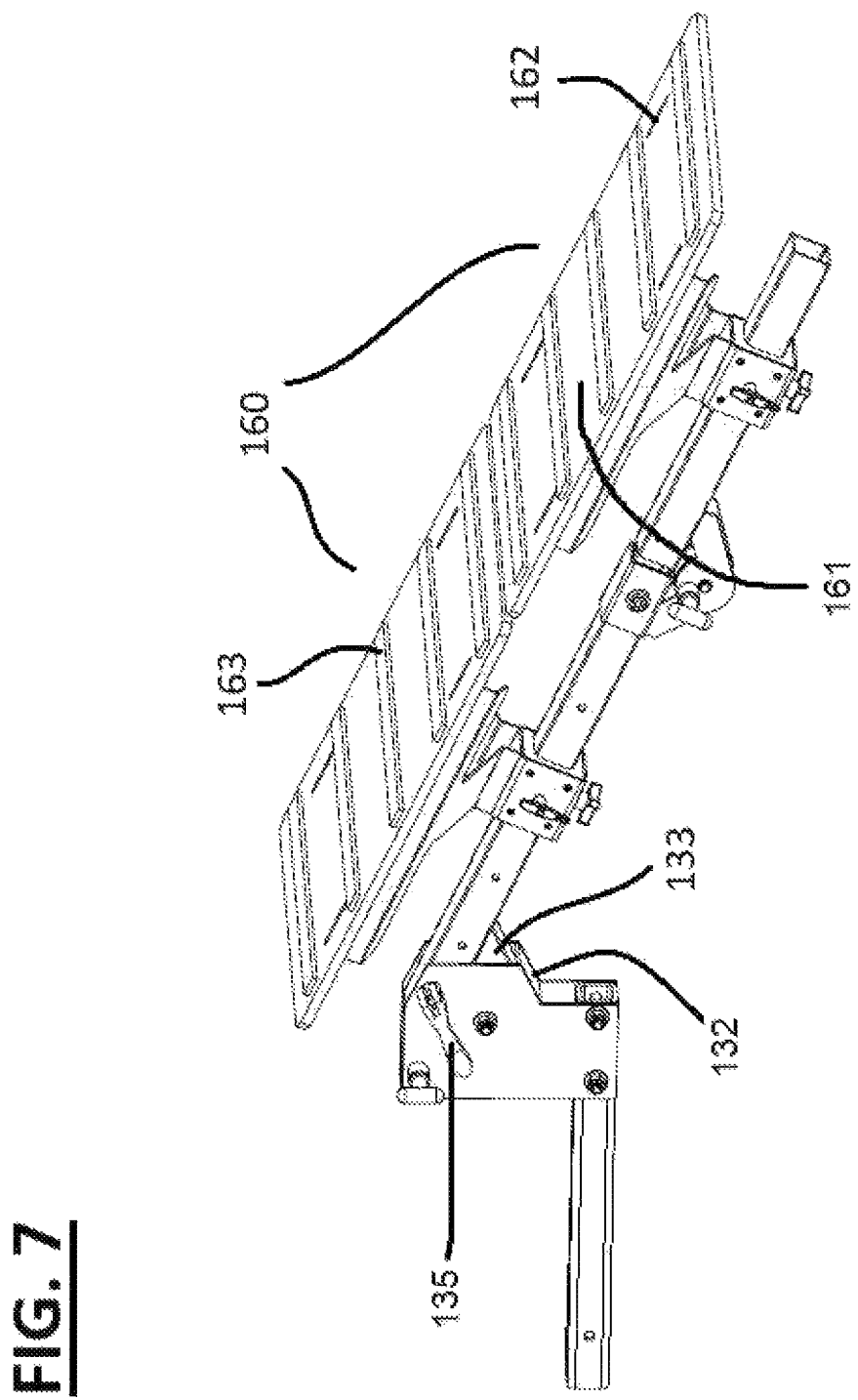
FIG. 7 provides a perspective view of a vehicle hitch system, according to an embodiment of the present invention.
Figure 8:
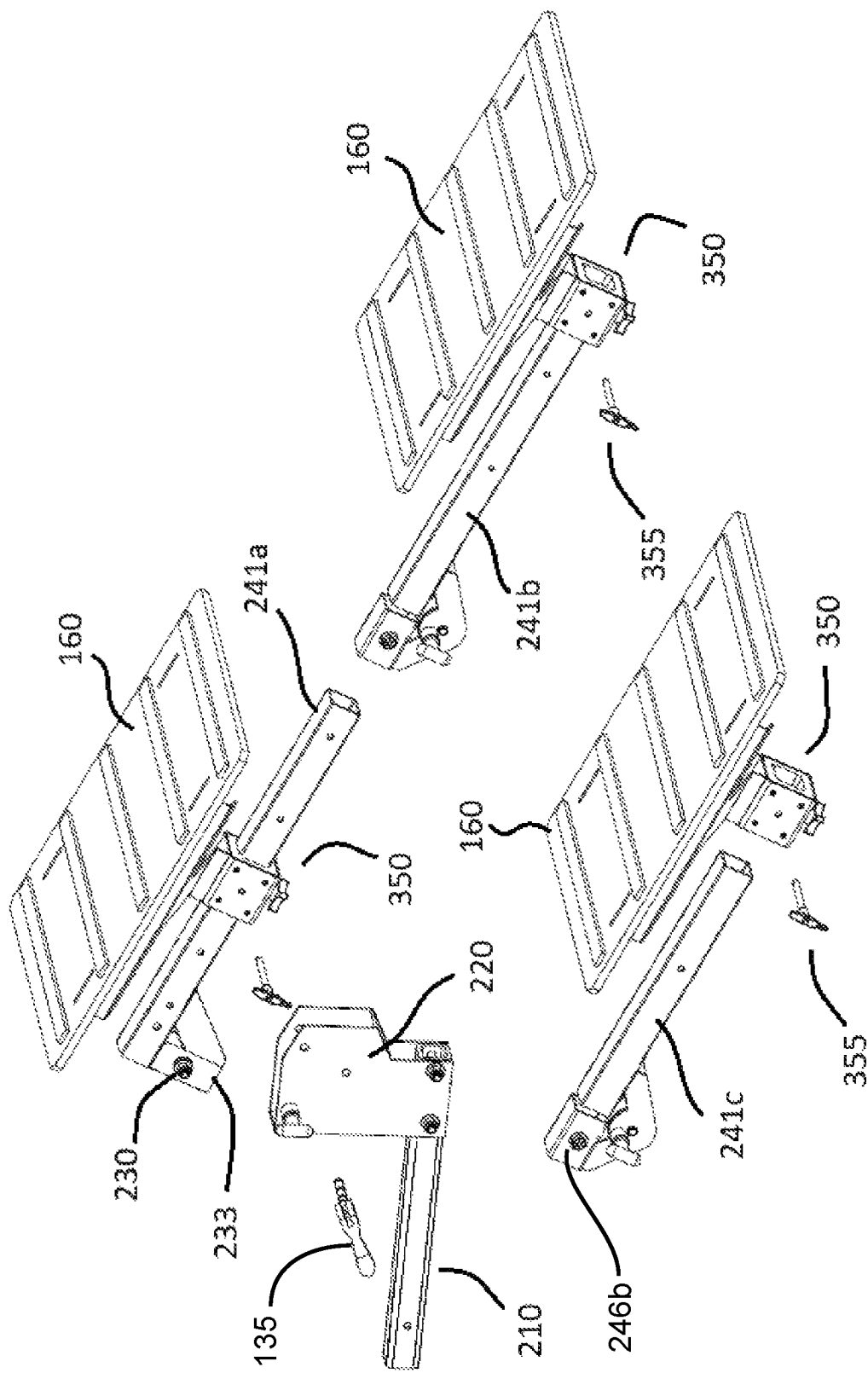
FIG. 8 provides an exploded perspective view of a vehicle hitch system, according to an embodiment of the present invention.

As seen in FIGS. 6-8, the support member 161 may comprise a ramp operable to support an animal or person walking up or down the ramp, and the securing mechanism 163 may comprise a high-friction surface (i.e., similar to sandpaper) and/or a gripping member (i.e., a low-profile board arranged longitudinally from left to right across the surface) for providing grip on an upper surface of a ramp. The ramp may be secured to the accessory mount 350 via a plurality of engagement mechanisms 162 comprising bolts traversing passages in the ramp.

Figure 10:
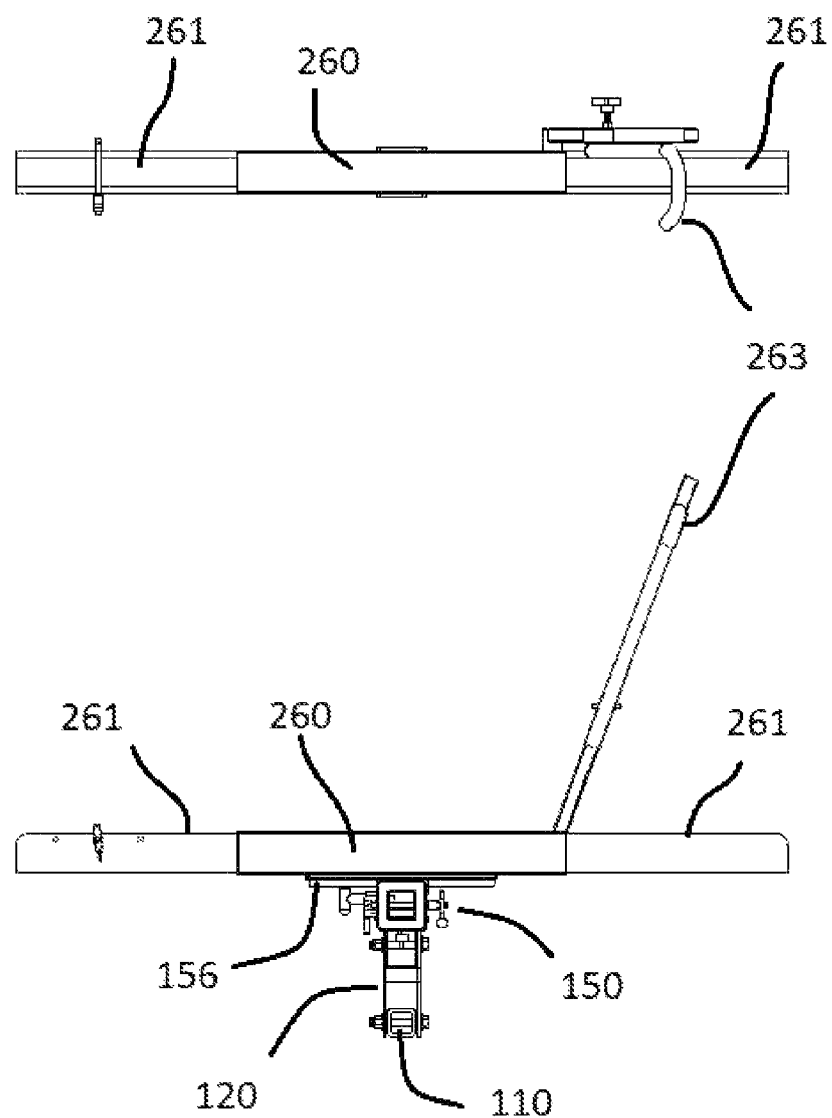
FIG. 10 provides top-down (see top) and front (see bottom) views of a vehicle hitch system, according to an embodiment of the present invention.
Figure 11:
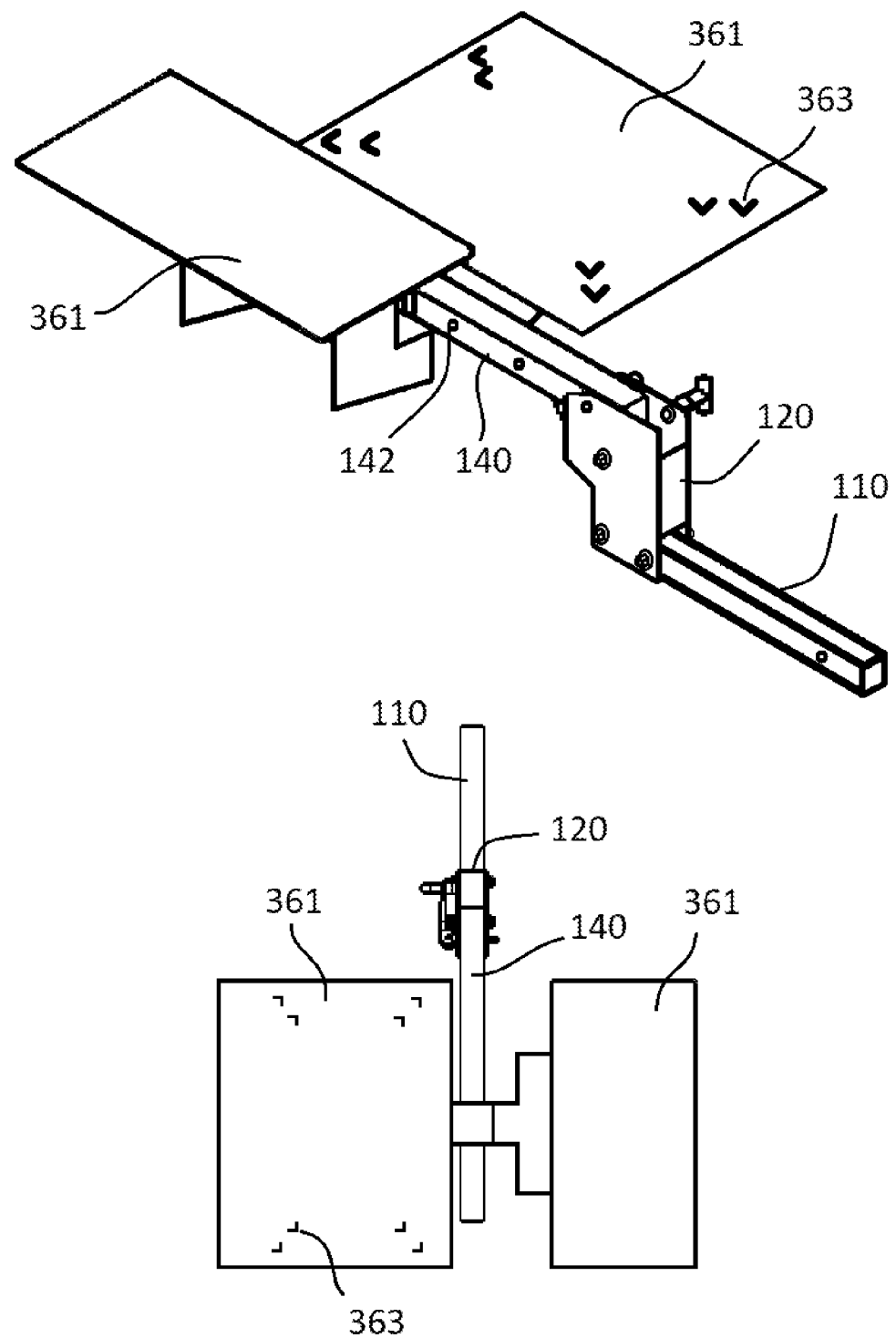
FIG. 11 provides perspective (see top) and top-down (see bottom) views of a vehicle hitch system, according to an embodiment of the present invention.
Figure 12:
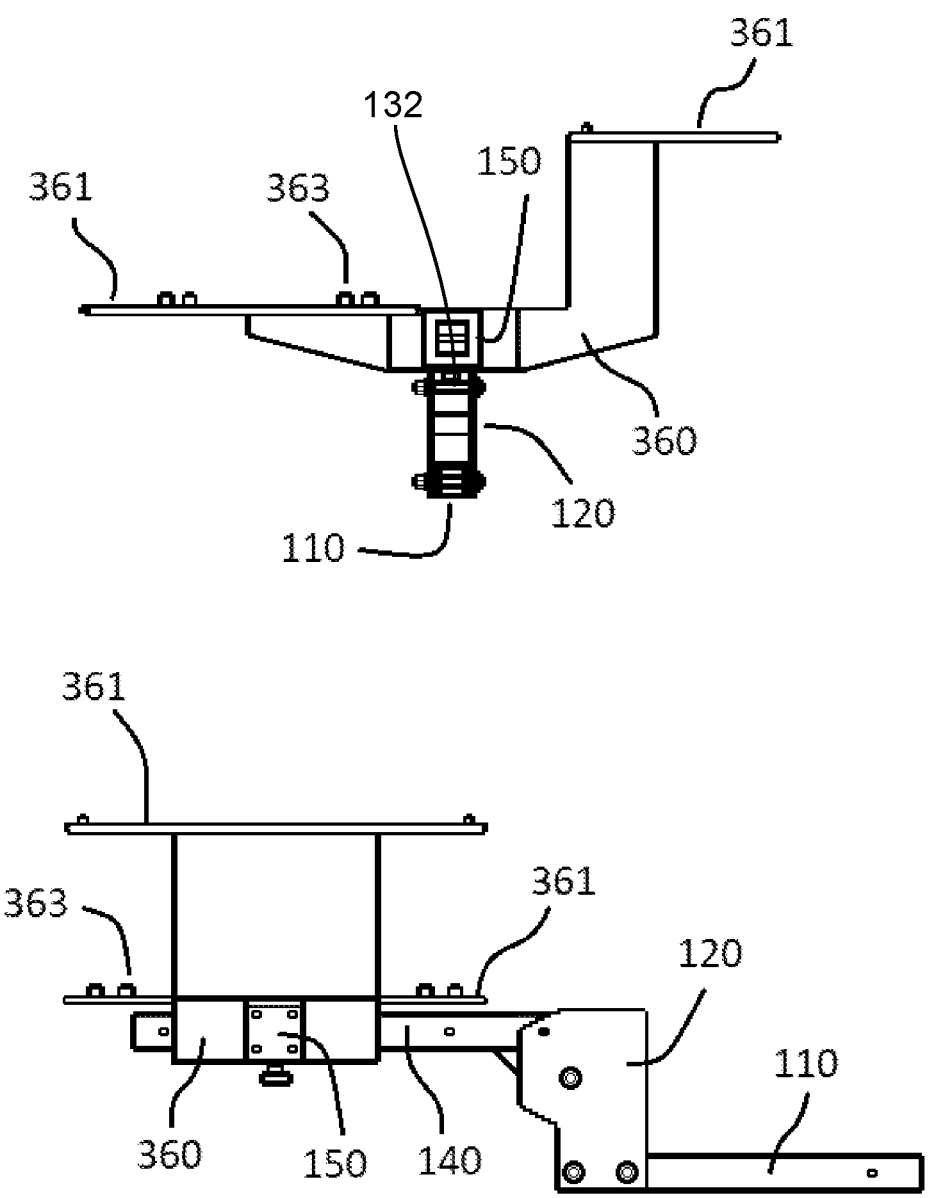
FIG. 12 provides front (see top) and side (see bottom) views of a vehicle hitch system, according to an embodiment of the present invention.

In another embodiment, as seen in FIGS. 9 and 10, the support member 260 may have a shape comprising a channel for supporting a tire of a bike or motorcycle; and the securing mechanism 263 may comprise a wheel clamp (i.e., a spring-loaded bar having a curved end for fitting over a wheel) for securing a bicycle or motorcycle in place In another embodiment, as seen in FIGS. 11 and 12, the support member 360 may comprise a multi-tier platform for supporting a grill and grilling equipment, and the securing mechanism 363 may comprise at plurality of flanges and passages for bolts to secure the feet of the grill.

Figure 13:
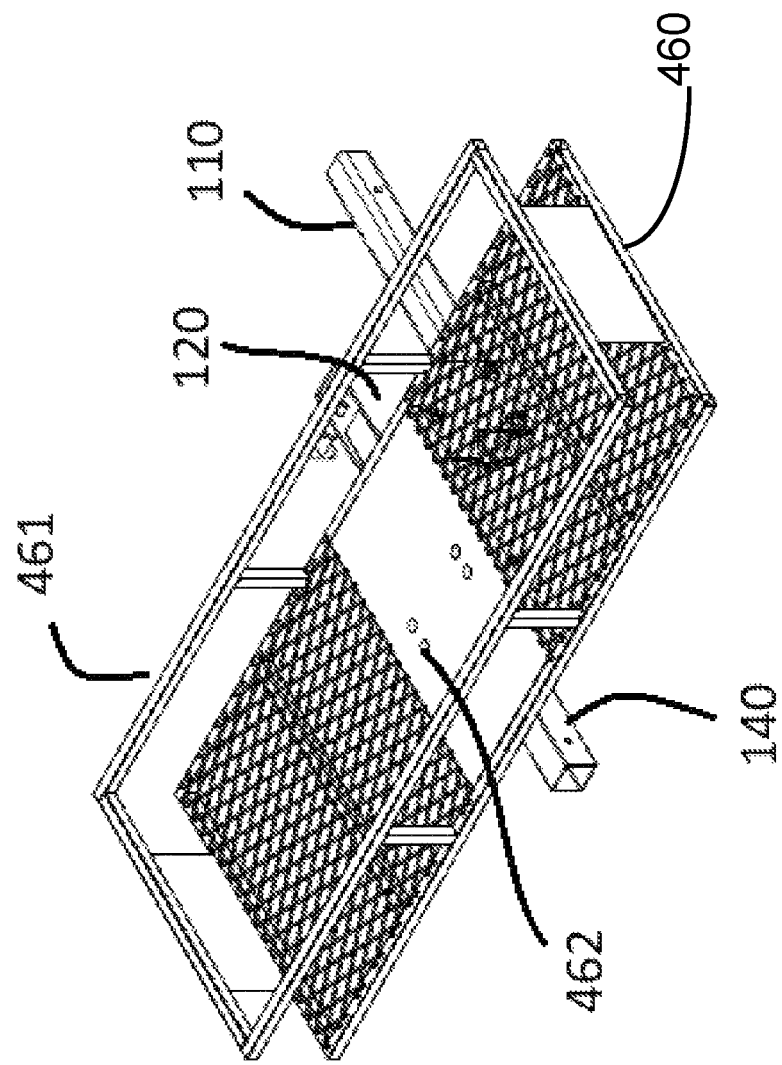
FIG. 13 provides a perspective view of a vehicle hitch system, according to an embodiment of the present invention.

In yet another embodiment, as seen in FIGS. 13 and 14, the support member 460 may comprise a utility basket 461 for supporting a cooler and/or other various pieces of equipment (i.e., a tackle box, a thermos, a tent bag, a sleeping bag, a suitcase, etc.), and securing.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A modular accessory mounting system operable to secure to a vehicle hitch system, the system comprising:
   a. a base that comprises a connector operable to attach a support frame to a vehicle mount, wherein said vehicle mount is operable to removably engage with a hitch receiver of a vehicle and said support frame is a mounting bar having a plurality of lateral attachment points a length of said mounting bar; and
   b. a plurality of accessory mounts having a collar that is operable to slidably engage with said mounting bar wherein said plurality of accessory mounts are operable to secure a plurality of accessory attachments and said collar is operable to anchor said accessory mounts to any of said plurality of lateral attachment points along the length of said mounting bar.

2. The system of claim 1, wherein said collar has an engagement mechanism operable to fix said accessory mount to one of said lateral attachment points.

3. The system of claim 1, wherein said connector attaches said support frame to said vehicle mount in an angularly adjustable manner.

4. The system of claim 3, wherein said mounting bar is operable to securely engage with at least two of said plurality of accessory mounts simultaneously, said at least two accessory mounts being engaged at different lateral attachment points along said length of said mounting bar.

5. The system of claim 4, wherein said mounting bar comprises a plurality of segments removably secured to each other.

6. The system of claim 5, wherein said plurality of segments comprises a first segment and a second segment, said first segment comprising a proximal end attached to said connector via a pivot, and a distal end connected to said second segment via a segment collar of said second segment.

7. The system of claim 6, wherein said segment collar is operable to securely engage with said first segment at any of the plurality of lateral attachment points along a length of said first segment.

8. The system of claim 5, wherein said plurality of segments comprises a first segment and a second segment, said first segment comprising a proximal end attached to said connector via a pivot of said angularly adjustable manner, and a distal end connected to said second segment via a reduced end of said second segment.

9. The system of claim 5, wherein said plurality of segments are connected in series, said plurality of segments comprising a first segment, a second segment, and a third segment.

10. The system of claim 6, wherein said second segment comprises a folding mechanism, the folding mechanism being connected at a first side to said collar and at a second side to a mounting bar of said second segment, said folding mechanism being operable to allow said beam to fold into a folded position.

11. The system of claim 2, wherein said collar of said accessory mount has an inner layer comprising a material operable to slide onto said mounting bar of said support frame without damaging or substantially wearing down an outer surface of said mounting bar or a protective coating on said outer surface, said material retaining sufficient compression strength to securely support the weight of said accessory mount, an accessory support, and a piece of equipment secured to said accessory support.

12. The system of claim 11, wherein said material comprises an acetal homopolymer.

13. The system of claim 2, wherein said accessory mount comprises a plurality of support members operable to provide a broad base for securing said accessory support.

14. The system of claim 2, wherein said plurality of accessory attachments each comprise a different accessory support, said plurality of different accessory supports each being operable to secure a different type of equipment to said system.

15. The system of claim 14, wherein at least one of said plurality of accessory attachments comprises at least one of a utility basket, a grill support, and a bike rack.

16. The system of claim 14, wherein at least one of said plurality of accessory attachments comprises a segmented ramp.

17. The system of claim 16, wherein said support frame is angled such that a distal end of said support frame is supported at or near ground level, and at least one of said ramps comprises a proximal end supported at or near a height of at least one of a bed or cargo area of said vehicle, such that an animal or person may easily traverse the ramp from the ground to the vehicle or vice versa.

18. A vehicle hitch system, the system comprising:
   a. a vehicle mount operable to secure said system to a hitch receiver of a vehicle;
   b. a connector operable to connect said vehicle mount to a support frame in an angularly adjustable manner;
   c. said support frame comprising a plurality of segments and being operable to engage with at least one of a plurality of different accessory attachments, each of said plurality of different accessory attachments comprising an accessory mount and an accessory support;
   d. said accessory mount comprising a collar operable to slide onto and securely engage with said support frame at any of a plurality of different points along a length of said support frame; and
   e. said accessory support comprising a shape complementary to a shape of a piece of equipment to be secured thereto, wherein said plurality of segments are attached to a folding mechanism that is rotatable about a pin and folds said plurality of segments along the center of said vehicle mount and hitch receiver of a vehicle into a folding position.

19. A method of using a vehicle hitch system, the method comprising the steps of:
   a. providing a vehicle hitch system comprising a vehicle mount, a connector, a support frame having a plurality of different attachment points along a length of said support frame, and a plurality of different accessory attachments having a collar that is operable to slidably engage with said support frame and secure to one of said different attachment points;
b. engaging said vehicle mount with a hitch receiver of a vehicle;
c. engaging a first accessory attachment of said plurality of different accessory attachments with said support frame; and
d. securing a piece of equipment to said first accessory attachment.

20. The method of claim 19, wherein said support frame comprises a first segment and a second segment, said first segment being pivotably engaged with said connector and said second segment being foldably and removably attachable to said first segment, and further comprising the steps of:
a. adjusting an angle of said support frame with respect to said vehicle mount;
b. securely attaching said second segment to said first segment; and
c. securing a second accessory attachment to said second segment wherein said second segment folds into said first segment along a plane of symmetry of said hitch receiver of a vehicle.

* * * * *